(12) United States Patent
Bodiya et al.

(10) Patent No.: US 11,789,274 B2
(45) Date of Patent: *Oct. 17, 2023

(54) DISPLAYS AND METHODS OF OPERATING THEREOF

(71) Applicant: GOOGLE LLC, Mountain View, CA (US)

(72) Inventors: Timothy Paul Bodiya, Toronto (CA); Shreyas Potnis, Kitchener (CA); Stuart James Myron Nicholson, Waterloo (CA); Bergen Fletcher, St. Jacobs (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,444

(22) Filed: May 18, 2022

(65) Prior Publication Data

US 2022/0342221 A1    Oct. 27, 2022

Related U.S. Application Data

(63) Continuation of application No. 16/738,074, filed on Jan. 9, 2020, now Pat. No. 11,347,062.

(60) Provisional application No. 62/904,742, filed on Sep. 24, 2019, provisional application No. 62/791,514, filed on Jan. 11, 2019.

(51) Int. Cl.
*G02B 5/32* (2006.01)
*G09G 5/00* (2006.01)
*G02B 27/01* (2006.01)
*H04N 9/31* (2006.01)
*G02B 27/00* (2006.01)
*G09G 5/10* (2006.01)

(52) U.S. Cl.
CPC ..... *G02B 27/0172* (2013.01); *G02B 27/0093* (2013.01); *G09G 5/10* (2013.01); *H04N 9/3155* (2013.01); *G02B 2027/0178* (2013.01); *G09G 2360/144* (2013.01)

(58) Field of Classification Search
CPC ....................................................... G02B 6/30
See application file for complete search history.

(56) References Cited

U.S. PATENT DOCUMENTS 6,442,310 B1 * 8/2002 Wills ...................... G02B 6/32
                                                                385/33
2010/0142015 A1 * 6/2010 Kuwahara ............ G03H 1/0272
                                                                359/3

(Continued)

*Primary Examiner* — Nan-Ying Yang

(57) ABSTRACT

There is provided a method of operating a wearable heads-up display (WHUD). The WHUD may include a light source, a spatial modulator, and a display optic. The method may include generating, by the light source, an output light to form an image viewable by a user of the WHUD. The method may also include receiving a position of a pupil of the user relative to an eyebox of the WHUD, and obtaining an image correction map based on the position of the pupil. Moreover, the method may include adjusting the output light to form an adjusted output light. The adjusted output light may be adjusted based on the image correction map to reduce at least one of an intensity non-uniformity and a color balance non-uniformity of the image. The method may also include directing, by the display optic, the adjusted output light into a field of view of the user.

20 Claims, 12 Drawing Sheets

(56) References Cited

U.S. PATENT DOCUMENTS

2017/0161951 A1* 6/2017 Fix .................. G06V 40/19
2018/0365875 A1* 12/2018 Yildiz ................ G06V 40/193

* cited by examiner

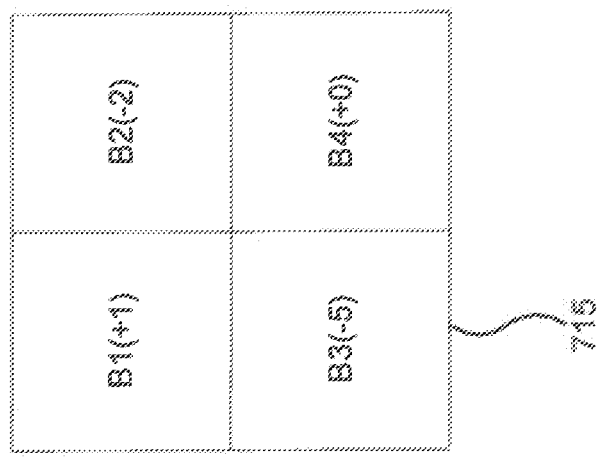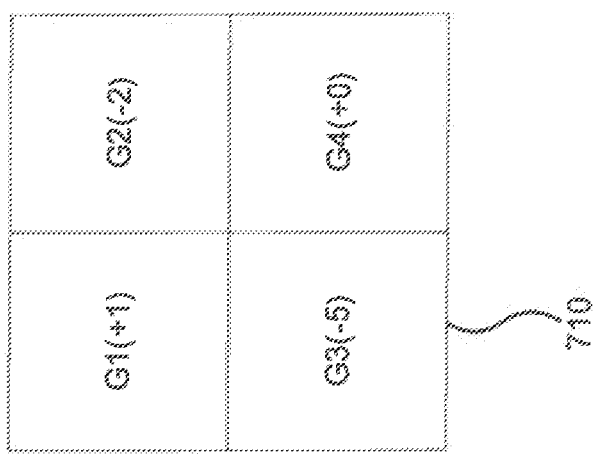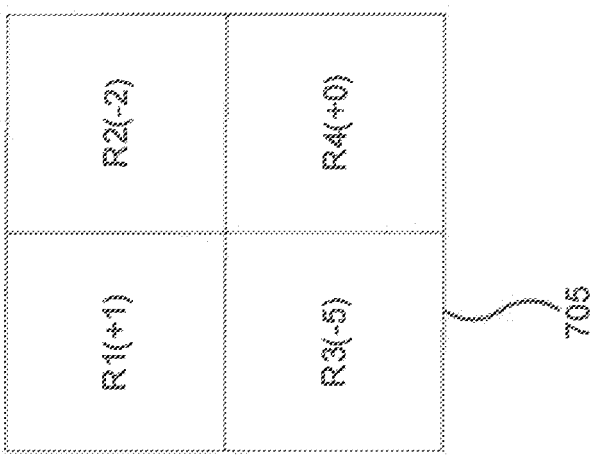
Fig. 7

DISPLAYS AND METHODS OF OPERATING THEREOF

CROSS-REFERENCE TO RELATED APPLICATIONS

The present application is a continuation application of U.S. patent application Ser. No. 16/738,074, entitled "DISPLAYS AND METHODS OF OPERATING THEREOF" and filed on Jan. 9, 2020, which claims priority to U.S. Provisional Application Ser. No. 62/904,742, entitled "DISPLAYS AND METHODS OF OPERATING THEREOF" and filed on Sep. 24, 2019, which claims priority to U.S. Provisional Application Ser. No. 62/791,514, entitled "SYSTEMS, DEVICES, AND METHODS FOR LIGHT GUIDE BASED WEARABLE HEADS-UP DISPLAYS" and filed on Jan. 11, 2019, the entirety of which is incorporated by reference herein.

FIELD

The present specification relates to displays and methods of operating thereof, and in particular to wearable head-us displays and methods of operating thereof to provide enhanced image uniformity.

BACKGROUND

Displays may be used to form still or moving images. Some displays may use a display panel to form images. Examples of such display panels include Light Emitting Diode (LED) display panels, Liquid Crystal Display (LCD) panels, and the like. In addition, some displays may use projectors to project still or moving images. Small displays may be used to form, or as a part of, mobile or wearable devices. For example, some displays may form or be part of a wearable heads-up display.

SUMMARY

According to an implementation of the present specification there is provided a method of operating a wearable heads-up display (WHUD), the WHUD comprising a light source, a spatial modulator, and a display optic, the method comprising: generating, by the light source, an output light to form an image viewable by a user of the WHUD; receiving a position of a pupil of the user relative to an eyebox of the WHUD; obtaining an image correction map based on the position of the pupil; adjusting the output light to form an adjusted output light, the adjusted output light adjusted based on the image correction map to reduce at least one of an intensity non-uniformity and a color balance non-uniformity of the image; and directing, by the display optic, the adjusted output light into a field of view of the user.

The receiving the position of the pupil may comprise tracking a gaze of a corresponding eye of the user.

The method may further comprise: obtaining a region of interest in the image corresponding to the gaze; and wherein: the adjusting the output light based on the image correction map may comprise adjusting the output light based on the image correction map to reduce at least one of the intensity non-uniformity and the color balance non-uniformity in the region of interest of the image.

The obtaining the image correction map may comprise retrieving the image correction map from a repository storing a plurality of image correction maps in association with corresponding positions of the pupil relative to the eyebox.

The obtaining the image correction map may comprise calculating the image correction map based on the position of the pupil.

The adjusting the output light may comprise controlling the light source to adjust an intensity of the output light.

The light source may comprise a red light source, a green light source, and a blue light source; and the adjusting the output light may comprise controlling at least one of the red light source, the green light source, and the blue light source to adjust an intensity of a corresponding red output light, a green output light, and a blue output light respectively.

The adjusting the output light may comprise adjusting a polarization of the output light.

The obtaining the image correction map may comprise obtaining the image correction map further based on an indication of a size of the pupil.

The indication of the size of the pupil may comprise an ambient brightness; and the obtaining the image correction map further based on the indication of the size of the pupil may comprise obtaining the image correction map further based on the ambient brightness.

The method may further comprise: operating the WHUD to display a plurality of corrected test images to the user; and receiving user input selecting a given corrected test image from the plurality of corrected test images; and wherein: the obtaining the image correction map may comprise determining the image correction map corresponding to the given corrected test image.

The WHUD may further comprise a controller in communication with the light source and the spatial modulator; the generating the output light may comprise the controller controlling the light source to generate the output light; the receiving the position of the pupil may comprise receiving the position of the pupil at the controller; the obtaining the image correction map may comprise obtaining the image correction map by the controller; and the adjusting the output light may comprise the controller controlling the light source to adjust the output light.

The output light may comprise a plurality of wavelengths; the display optic may comprise: a light guide; an incoupler carried by the light guide, the incoupler to receive the output light from the spatial modulator and direct at least a portion of the output light into the light guide, the light guide to internally reflect the portion of the output light to form a reflected light, the output light having a plurality of incoupling losses corresponding to the plurality of wavelengths of the output light; an outcoupler carried by the light guide, the outcoupler to direct at least a portion of the reflected light out of the light guide towards an eye of the user wearing the WHUD; and the adjusting the output light may comprise adjusting the output light based on the image correction map to reduce at least one of the intensity non-uniformity and the color balance non-uniformity of the image caused by the incoupling losses.

The output light may comprise a first light having a first wavelength and a second light having a second wavelength; the incoupler may be to direct at least a portion of the first light and at least a portion of the second light into the light guide, the light guide may be to internally reflect the portion of the first light and the portion of the second light to form a first reflected light and a second reflected light respectively, the first reflected light may be incident upon a reflective surface of at least one of the incoupler and the light guide at a first bounce position and the second reflected light may be incident upon the reflective surface of at least one of the incoupler and the light guide at a second bounce position, the first light may have a first incoupling loss based on the first bounce position and the second light may have a second incoupling loss based on the second bounce position; and the adjusting the output light may comprise adjusting the output light based on the image correction map to reduce at least one of the intensity non-uniformity and the color balance non-uniformity of the image caused by a difference between the first incoupling loss and the second incoupling loss.

The image may comprise a plurality of pixels, each pixel having a corresponding field position comprising spatial coordinates of the pixel in the image; for each given pixel, the incoupler may be to receive the output light at an incidence position on and an incidence angle relative to the incoupler based on the field position of the given pixel; and the adjusting the output light may comprise adjusting the output light based on the image correction map to reduce at least one of the intensity non-uniformity and the color balance non-uniformity of the image further caused by variations in the incidence position and the incidence angle from one pixel to another.

According to another implementation of the present specification there is provided a wearable heads-up display (WHUD) comprising: a light source to generate an output light; a spatial modulator to receive the output light from the light source; a display optic to receive the output light from the spatial modulator and direct the output light towards an eye of a user of the WHUD to form an image viewable by the user; and a controller in communication with the light source and the spatial modulator, the controller to: receive a position of a pupil of the user relative to an eyebox of the WHUD worn by the user; obtain an image correction map based on the position of the pupil; and adjust the output light based on the image correction map to reduce at least one of an intensity non-uniformity and a color balance non-uniformity of the image.

To receive the position of the pupil the controller may be to receive gaze position information of a gaze of the eye of the user.

The WHUD may further comprise: a gaze tracking module to track the gaze of the eye of the user, the gaze tracking module in communication with the controller; and wherein: to receive the position of the pupil the controller may be to receive the gaze position information from the gaze tracking module.

The controller may be to receive an indicator of a region of interest in the image corresponding to the gaze; and to adjust the output light based on the image correction map the controller may be to adjust the output light based on the image correction map to reduce at least one of the intensity non-uniformity and the color balance non-uniformity in the region of interest of the image.

To obtain the image correction map the controller may be to retrieve the image correction map from a repository storing a plurality of image correction maps in association with corresponding positions of the pupil relative to the eyebox.

To obtain the image correction map the controller may be to calculate the image correction map based on the position of the pupil.

To adjust the output light the controller may be to control the light source to adjust an intensity of the output light.

The light source may comprise a red light source, a green light source, and a blue light source; and to adjust the output light the controller may be to control at least one of the red light source, the green light source, and the blue light source to adjust an intensity of a corresponding red output light, a green output light, and a blue output light respectively.

To adjust the output light the controller may be to adjust a polarization of the output light.

To obtain the image correction map the controller may be to obtain the image correction map further based on an indication of a size of the pupil.

The indication of the size of the pupil may comprise an ambient brightness; and to obtain the image correction map further based on the indication of the size of the pupil the controller may be to obtain the image correction map further based on the ambient brightness.

The WHUD may further comprise: an ambient brightness sensor in communication with the controller, the ambient brightness sensor to sense the ambient brightness and to communicate the ambient brightness to the controller.

The controller may be further to: control the light source and the spatial modulator to display a plurality of corrected test images to the user; and receive user input selecting a given corrected test image from the plurality of corrected test images; and wherein: to obtain the image correction map the controller may be to determine the image correction map corresponding to the given corrected test image.

The light source may comprise a laser light source; the spatial modulator may comprise a scan mirror; and the light source and the spatial modulator may be parts of a laser projector.

The output light may comprise a plurality of wavelengths; the display optic may comprise: a light guide; an incoupler carried by the light guide, the incoupler to receive the output light from the spatial modulator and direct at least a portion of the output light into the light guide, the light guide to internally reflect the portion of the output light to form a reflected light, the output light having a plurality of incoupling losses corresponding to the plurality of wavelengths of the output light; an outcoupler carried by the light guide, the outcoupler to direct at least a portion of the reflected light out of the light guide towards an eye of the user wearing the WHUD; and to adjust the output light the controller may be to adjust the output light based on the image correction map to reduce at least one of the intensity non-uniformity and the color balance non-uniformity of the image caused by the incoupling losses.

The output light may comprise a first light having a first wavelength and a second light having a second wavelength; the incoupler may be to direct at least a portion of the first light and at least a portion of the second light into the light guide, the light guide may be to internally reflect the portion of the first light and the portion of the second light to form a first reflected light and a second reflected light respectively, the first reflected light may be incident upon a reflective surface of at least one of the incoupler and the light guide at a first bounce position and the second reflected light may be incident upon the reflective surface of at least one of the incoupler and the light guide at a second bounce position, the first light may have a first incoupling loss based on the first bounce position and the second light may have a second incoupling loss based on the second bounce position; and to adjust the output light the controller may be to adjust the output light based on the image correction map to reduce at least one of the intensity non-uniformity and the color balance non-uniformity of the image caused by a difference between the first incoupling loss and the second incoupling loss.

The image may comprise a plurality of pixels, each pixel having a corresponding field position comprising spatial coordinates of the pixel in the image; for each given pixel, the incoupler may be to receive the output light at an incidence position on and an incidence angle relative to the incoupler based on the field position of the given pixel; and to adjust the output light the controller may be to adjust the output light based on the image correction map to reduce at least one of the intensity non-uniformity and the color balance non-uniformity of the image further caused by variations in the incidence position and the incidence angle from one pixel to another.

According to yet another implementation of the present specification there is provided a wearable heads-up display (WHUD) comprising: a light source to generate an output light comprising a plurality of wavelengths, the output light to form an image; a spatial modulator to receive the output light from the light source; a light guide; an incoupler carried by the light guide, the incoupler to receive the output light from the spatial modulator and direct at least a portion of the output light into the light guide, the light guide to internally reflect the portion of the output light to form a reflected light, the output light having a plurality of incoupling losses corresponding to the plurality of wavelengths of the output light; an outcoupler carried by the light guide, the outcoupler to direct at least a portion of the reflected light out of the light guide towards an eye of a user wearing the WHUD; and a controller in communication with the light source and the spatial modulator, the controller to: obtain an image correction map; and adjust the output light based on the image correction map to reduce at least one of an intensity non-uniformity and a color balance non-uniformity of the image caused by the incoupling losses.

The output light may comprise a first light having a first wavelength and a second light having a second wavelength; the incoupler may be to direct at least a portion of the first light and at least a portion of the second light into the light guide, the light guide may be to internally reflect the portion of the first light and the portion of the second light to form a first reflected light and a second reflected light respectively, the first reflected light may be incident upon a reflective surface of at least one of the incoupler and the light guide at a first bounce position and the second reflected light may be incident upon the reflective surface of at least one of the incoupler and the light guide at a second bounce position, the first light may have a first incoupling loss based on the first bounce position and the second light may have a second incoupling loss based on the second bounce position; and the controller may be to adjust the output light based on the image correction map to reduce at least one of intensity non-uniformity and the color balance non-uniformity of the image caused by a difference between the first incoupling loss and the second incoupling loss.

The image may comprise a plurality of pixels, each pixel having a corresponding field position comprising spatial coordinates of the pixel in the image; for each given pixel, the incoupler may be to receive the output light at an incidence position on and an incidence angle relative to the incoupler based on the field position of the given pixel; and the controller may be further to: adjust the output light based on the image correction map to reduce at least one of the intensity non-uniformity and the color balance non-uniformity of the image further caused by variations in the incidence position and the incidence angle from one pixel to another.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 7 shows example correction maps, in accordance with a non-limiting implementation of the present specification.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" and variants such as "carried by" are generally used to refer to a physical coupling between two objects. The physical coupling may be direct physical coupling (i.e. with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, and/or supported by, with or without any number of intermediary physical objects therebetween.

Figure 1:
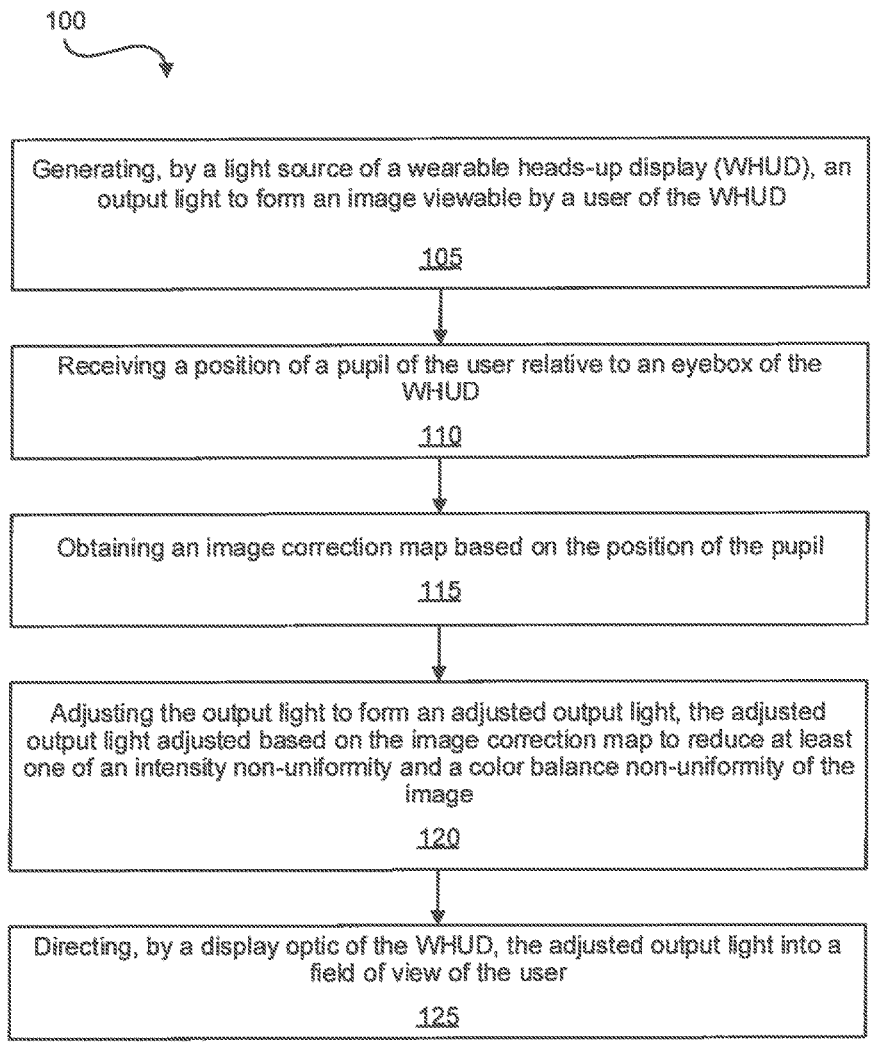
FIG. 1 shows a flowchart of an example method of operating a wearable heads-up display, in accordance with a non-limiting implementation of the present specification.

Displays may use optical elements to guide and manipulate light to form images. Such optical elements may cause non-uniformities in the displayed images. Some of these non-uniformities may include variations in intensity or color balance across the field of the image. The field may comprise the array of pixels that form the image. Moreover, some of the non-uniformities may comprise variations in intensity or color balance as a function of the position of the eye of the viewer relative to the field of view or eyebox of the display. The viewer of the display may also be described as the user of the display. FIG. 1 shows a flowchart of an example method 100 of operating a wearable heads-up display (WHUD). Method 100 may be used to reduce intensity or color balance non-uniformities of the images formed by the WHUD.

In some examples, the WHUD may comprise a light source, a spatial modulator, and a display optic. The display optic may comprise the optical elements used to guide or manipulate light. Example displays and WHUDs are described in greater detail in relation to FIGS. 2 and 3. Turning now to method 100, at box 105 an output light may be generated by the light source. The output light may be to form an image viewable by a user of the WHUD. In some examples, the output light may comprise laser light, and the like. In color displays, the output light may comprise a plurality of colors, such as red, green, blue, and the like.

At box 110, a position of a pupil of the user relative to an eyebox of the WHUD may be received. The eyebox may represent a region or area of possible positions of the eye of the user relative to the WHUD, at which positions the user is able to view the image formed by the WHUD. The eyebox may define the field of view of the WHUD. In some examples, receiving the position of the pupil may comprise measuring or tracking the position of the pupil. For example, receiving the position of the pupil may comprise tracking a gaze of a corresponding eye of the user. In some examples, the gaze of the eye may be tracked by tracking a glint of the eye, by imaging the eye, or by using other suitable methods.

Moreover, at box 115, an image correction map based on the position of the pupil may be obtained. In some examples, the image correction map may comprise instructions or a scheme for adjusting the output light to reduce or counteract the image intensity or color balance non-uniformities. The image correction map may also be referred to as the "correction map" or the "map" in short form. In some examples, adjusting the output light may comprise adjusting a characteristic of the output light such as its intensity, polarization, and the like. Moreover, in some examples, the map may specify how the characteristic of the output light is to be changed for each pixel or group of pixels of the image.

In some examples, obtaining the correction map may comprise retrieving the map from a repository storing a plurality of image correction maps in association with corresponding positions of the pupil relative to the eyebox. In some examples, this repository may store a database or library of maps organized as a function of the position of the pupil. Moreover, in some examples, obtaining the correction map may comprise calculating the correction map based on the position of the pupil, and the like. For example, in cases where a numerical or optical model of the WHUD is available, the map may be calculated for each position of the pupil relative to the eyebox of the WHUD using the numerical or optical model.

Turning now to box 120, the output light may be adjusted to form an adjusted output light. This adjustment may be based on the image correction map, to reduce at least one of an intensity non-uniformity and a color balance non-uniformity of the image. As discussed above, in some examples adjusting the output light may comprise adjusting a characteristic of the output light such as its intensity, polarization, and the like. In some examples, the output light may be adjusted for each pixel or group of pixels, as specified by the correction map. Moreover, it is contemplated that in examples where the output light comprises multiple colors, each color may have a corresponding correction map, and that each color may be adjusted based on its corresponding map.

At box 125, the display optic of the WHUD may direct the adjusted output light into a field of view of the user. This adjusted output light may, in turn, allow the user to view an image having reduced intensity or color balance non-uniformities. In other words, method 100 describes using a 2D map of 2D maps to adjust the output light and reduce or eliminate intensity or color balance non-uniformities in the image caused by the display optic or other optical elements of the WHUD.

The first level of 2D maps corresponds to the corrections across the field of the image. In other words, this first level of 2D maps sets out the adjustments to the output light for each pixel in the image field, at a given pupil position relative to the eyebox of the WHUD. As discussed above, the non-uniformities may vary also as a function of the pupil position. As such, the first level 2D map may be different for different positions of the pupil in the eyebox. The second level of 2D maps associates different pupil positions with their corresponding first level 2D map. In this manner, method 100 describes using a second level of 2D map of pupil positions to obtain the appropriate first level 2D map based on the pupil position in the eyebox. The selected first level 2D map may then be applied to adjust the output light per pixel across the field of the image.

Figure 2:
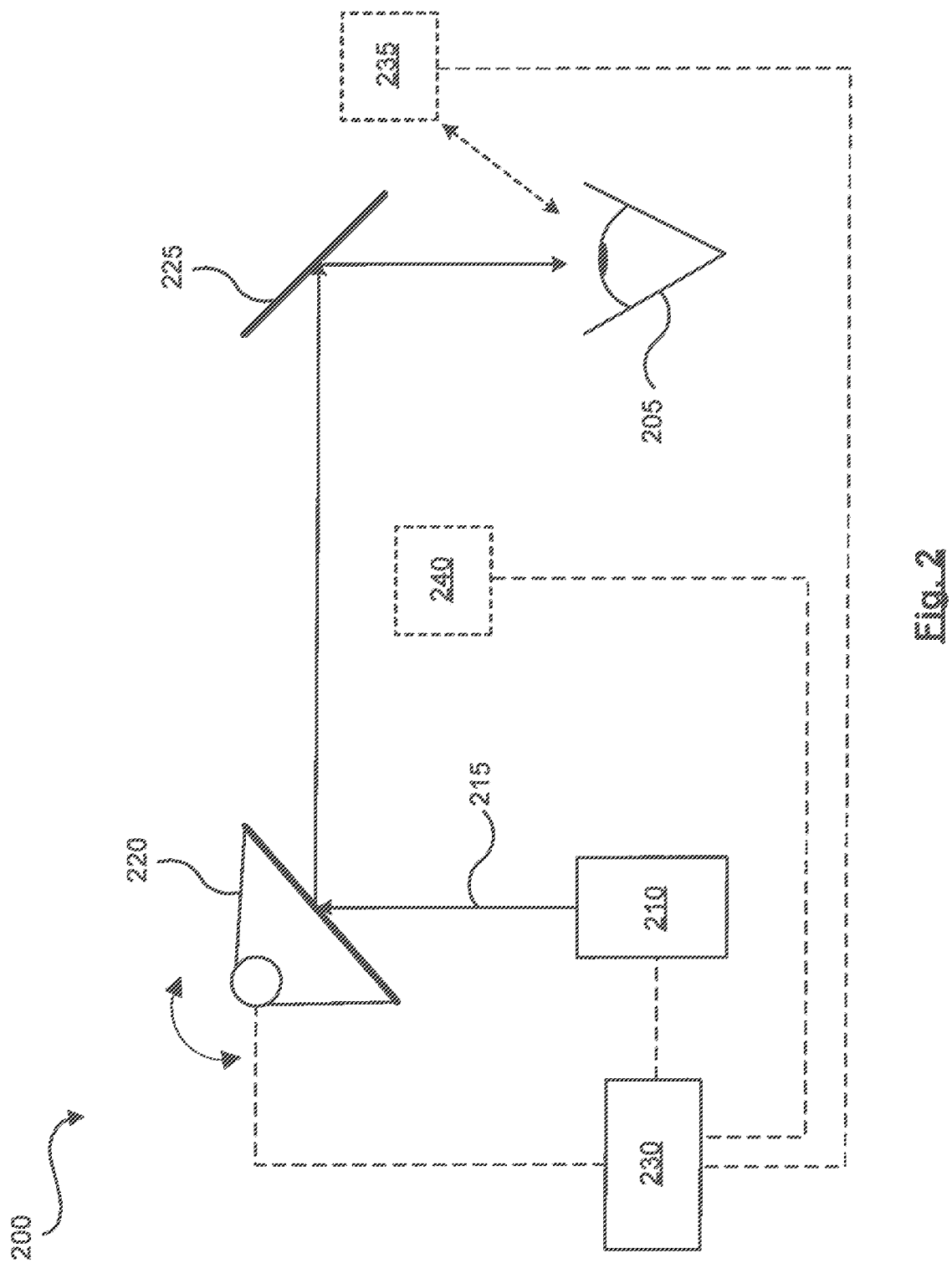
FIG. 2 shows a schematic representation of an example system which may be used to form or project an image, in accordance with a non-limiting implementation of the present specification.

Turning now to FIG. 2, a schematic representation of an example system 200 is shown. System 200 may be used to form or project an image viewable by an eye 205 of a viewer. System 200 may also be referred to or described as an image projection device, a display device, a display system, or a display. System 200 may comprise a light source 210 to generate an output light 215. In some examples, system 200 may be used to implement method 100 and the other methods described herein. Light source 210 may comprise a laser, a light emitting diode, and the like. System 200 may also comprise a spatial modulator 220 to receive output light 215 from light source 210. In some examples, spatial modulator 220 may comprise a movable reflector, a micro-electro-mechanical system (MEMS), a digital micromirror device (DMD), and the like.

Furthermore, system 200 may comprise a display optic 225 to receive output light 215 from spatial modulator 220 and direct the output light towards eye 205 of a viewer. In some examples, display optic 225 may comprise an optical combiner such as a holographic optical element (HOE), and the like. Moreover, in some examples, display optic 225 may comprise an optical incoupler, a waveguide, and an optical outcoupler, as described in greater detail in relation to FIG. 4. Moreover, in some examples system 200 may be a part of or incorporated into a wearable heads-up display (WHUD). Such a heads-up display may have different designs or form factors, such as the form factor of eyeglasses, as is described in greater detail in relation to FIG. 3. In examples where system 200 is in the form factor of glasses, display optic 225 may be on or in a lens of the glasses.

In addition, system 200 comprises a controller 230 in communication with light source 210 and spatial modulator 220. Controller 230 may control light source 210 and spatial modulator 220 to project an image. In some examples, the image to be projected may be a still image, a moving image or video, an interactive image, a graphical user interface, and the like.

In some examples, the controllers described herein such as controller 230 may comprise a processor in communication with a non-transitory processor-readable medium. The processor-readable medium may comprise instructions to cause the processors to control the light source and the spatial modulator as described in relation to the methods and systems described herein. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

In addition, system 200 may comprise a tracking module 235 to determine or track the position of the pupil of the eye of the user of system 200. In some examples, tracking module 235 may comprise a gaze tracking module, which may track the gaze of the eye using methods based on a glint of the eye, imaging the eye, and the like. Moreover, in some examples, tracking module 235 may comprise one or more of light emitters and light detectors to track the position of the pupil of the eye. Tracking module 235 may be in communication with controller 230 to communicate the position of the pupil of eye 205 to controller 230.

In FIG. 2 tracking module 235 is shown in dashed lines to signify that in some examples system 200 need not comprise tracking module 235. In such examples, a module or system external to system 200 may measure or track the position of the pupil of eye 205, and then communicate the position directly or indirectly to system 200 or controller 230.

Moreover, in some examples, system 200 may also comprise an ambient brightness sensor 240, which may be in communication with controller 230. Ambient brightness sensor 240 may sense the ambient brightness and communicate the ambient brightness to controller 230. In some examples, ambient brightness may be used as a proxy for or an indication of the size of the pupil of eye 205. Lower brightness generally correlates to larger pupil size and higher brightness to smaller pupil size. In some examples, the selection of the appropriate first level 2D correction map may be made based on the indication of the size of the pupil as well as based on the position of the pupil in the eyebox.

In addition, in FIG. 2 ambient brightness sensor 240 is shown in dashed lines to signify that in some examples system 200 need not comprise ambient brightness sensor 240. In such examples, a module or system external to system 200 may measure the ambient brightness, and then communicate the ambient brightness directly or indirectly to system 200 or controller 230.

Figure 3:
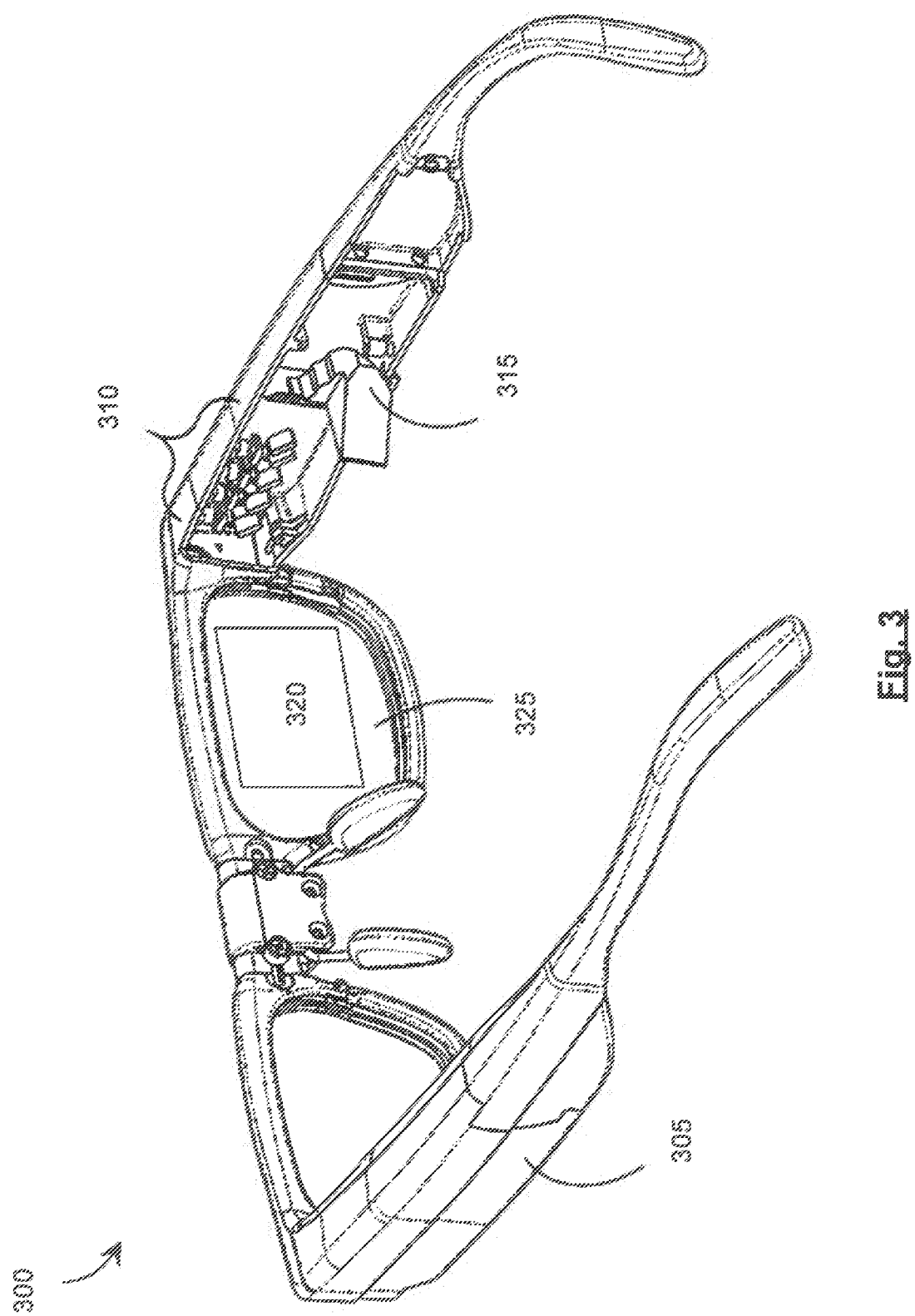
FIG. 3 shows a partial-cutaway perspective view of an example wearable heads-up display, in accordance with a non-limiting implementation of the present specification.

Turning now to FIG. 3, a partial-cutaway perspective view of an example wearable heads-up display (WHUD) 300 is shown. WHUD 300 includes a support structure 305 that in use is worn on the head of a user and has the general form factor and appearance of an eyeglasses (e.g. sunglasses) frame. Eyeglasses or sunglasses may also be generically referred to as "glasses". Support structure 305 may carry components of a system to display an image, such as system 200. For example, the light source module may be received in a space 310 in a side arm of support structure 305. In other examples, one or more of the image projection and output light adjustment system components or systems described herein may be received in or carried by support structure 305.

The spatial modulator of the systems described herein may be received in or be part of component 315 of support structure 305. The spatial modulator in turn may direct the output light onto a display optic 320 carried by a lens 325 of support structure 305. In some examples, display optic 320 may be similar in structure or function to display optic 225. Moreover, in some examples display optic 320 may comprise an optical incoupler, a waveguide, and an optical outcoupler, as described in greater detail in relation to FIG. 4.

Figure 4:
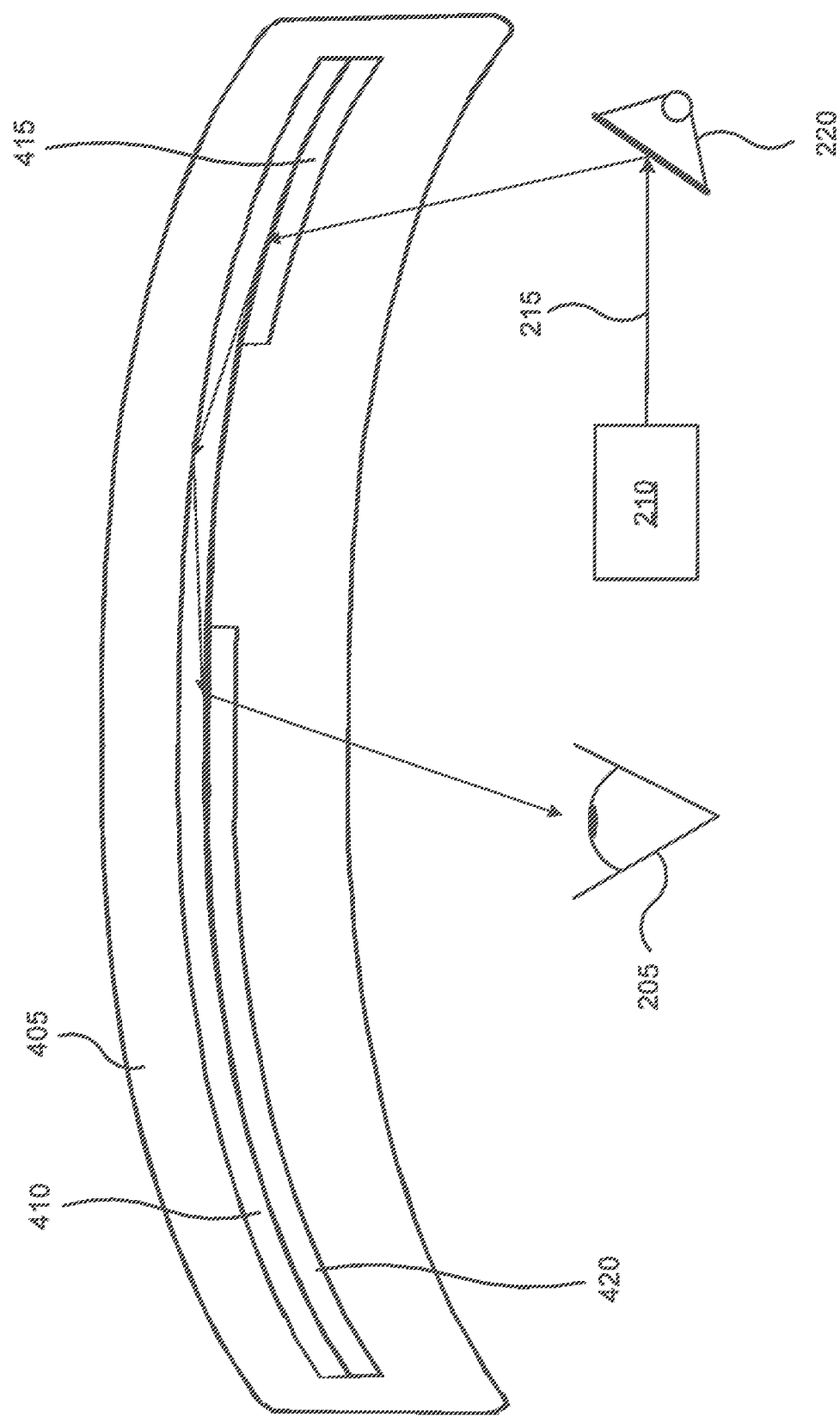
FIG. 4 shows a schematic cross-sectional representation of an example lens of an example wearable heads-up display, in accordance with a non-limiting implementation of the present specification.

Turning now to FIG. 4, a schematic cross-sectional representation is shown of an example lens 405 of an example WHUD. The components in FIG. 4 are not cross-hatched to allow for a clearer illustration of the path of an example ray of light traversing these components. In some examples, lens 405 may be used as lens 325 in WHUD 300. Lens 405 has embedded within it a display optic.

The display optic comprises a light guide 410, and an optical incoupler 415 and an optical outcoupler 420 both carried upon light guide 410. It is contemplated that in some examples, this display optic may be used as display optic 225 in system 200. In some examples, light guide 410 may guide light within it using total internal reflection. Incoupler 415 may receive an incoming beam of light, such as output light 215 generated by light source 210. Incoupler 415 may then redirect output light 215 towards light guide 410 at an angle that allows output light 215 to enter light guide 410, and to travel through light guide 410. Total internal reflection may prevent output light 215 from leaking from the walls of light guide 410.

Once output light 215 that is travelling in light guide 410 reaches and becomes incident upon outcoupler 420, outcoupler 420 may direct output light 215 out of light guide 410 and towards eye 205 of a user. In some examples, incoupler 415 and outcoupler 420 may comprise surface relief gratings (SRGs), holograms, and the like. Moreover, while FIG. 4 shows incoupler 415 and outcoupler 420 as being components carried on an outer surface of light guide 410, it is contemplated that in some examples the incoupler or the outcoupler may comprise surface features such as SRGs on the light guide itself. In other words, in some examples the incoupler or the outcoupler may be optical features or elements incorporated within or on the surface of the light guide itself.

Furthermore, it is contemplated that in some examples the incoupler may be incorporated within or on an inner surface of the light guide, such that the incoming output light passes through at least a portion of the light guide before impinging on the incoupler. In some examples, the combination of light guide 410, incoupler 415, and outcoupler 420 may be described as a display optic. Such a display optic may be used as display optic 225 in system 200 or display optic 320 in WHUD 300.

It is also contemplated that in some examples, the display optic shown in FIG. 4 may also comprise an exit pupil expander (EPE). The EPE may increase the number of exit pupils, thereby enlarging the eyebox and the field of view of displays whose display optics include the EPE. The operation of an example EPE is described in greater detail in relation to FIGS. 8 and 9. In some examples, the EPE may be disposed between light guide 410 and outcoupler 420. Moreover, in some examples, the EPE may be disposed on the side of outcoupler 420 opposite light guide 410. Furthermore, in some examples, the EPE may be combined with or incorporated into outcoupler 420. The EPE may comprise a SRG, a hologram, and the like.

Figure 5:
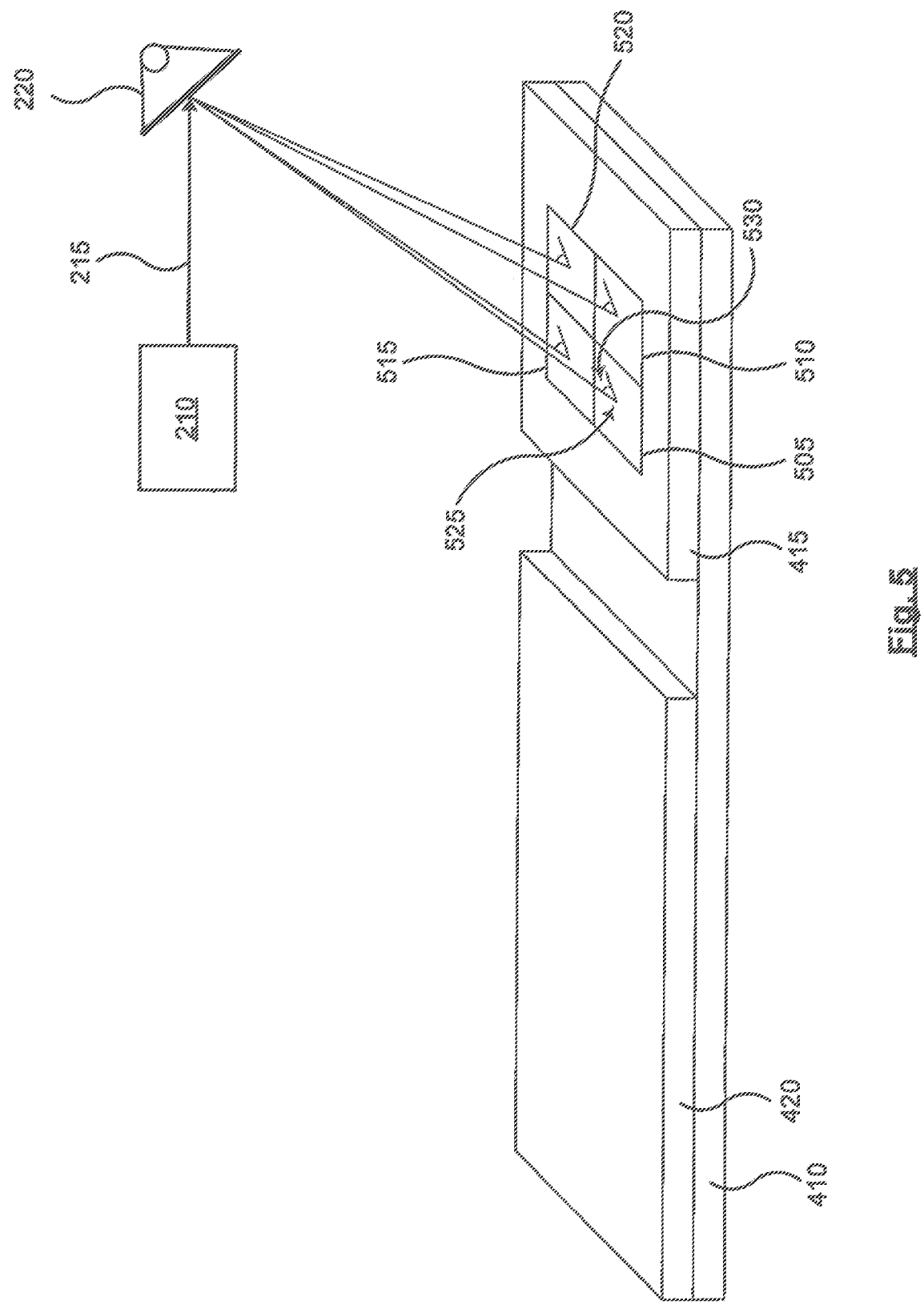
FIG. 5 shows a schematic representation of the display optic shown in FIG. 4.

In some examples, there may be variations in the optical path of the output beam through the display optic for different pixels of the image being formed. These variations may cause non-uniformities across the field of the image. FIG. 5 shows a schematic representation of the display optic shown in FIG. 4. FIG. 5 shows four pixels 505, 510, 515, and 520 projected by spatial modulator 220 on incoupler 415. While FIG. 5 shows for simplicity of illustration four pixels forming a 2×2 image field, it is contemplated that in some examples the field may have a different number of pixels. Moreover, the light guide, incoupler, and outcoupler which are shown as being curved in the cross-section in FIG. 4 are shown without said curvature (i.e. as being planar) in FIG. 5, for ease of illustration.

In addition, while FIG. 4 shows four beams extending from spatial modulator 220 to incoupler 415, it is contemplated that in display systems where the projector comprises a scanning projector, one beam may be rastered across the incoupler, or that the four beams may be projected sequentially.

FIG. 4 shows that the beam for each of the pixels may have an incidence position and an incidence angle on the incoupler, which may be different than the incidence positions and angles for the other pixels. For example, the beam to form pixel 505 may have an incidence position 525 and an incidence angle 530 relative to incoupler 415, which may be different than the corresponding incidence positions and angles for pixels 510, 515, and 520. This pixel-dependent or field position-dependent variation in incidence positions and angles may cause the output beam that is used to form the image to traverse a different optical path in the display optic for the different pixels of the image.

Different characteristics of the optical path in the display optic may affect optical losses in the display optic. Examples of such characteristics include angles and lengths of the optical path. Since the different pixels across the image field are formed by light beams traversing paths of different characteristics through the display optic, the optical losses may also vary across the field of the image. These variations in losses, in turn, may cause intensity or color balance non-uniformities in the image.

In other words, in some examples the image may comprise a plurality of pixels. Each pixel may have a corresponding field position comprising spatial coordinates of the pixel in the image. These spatial coordinates may be used to describe or define the field positions. For each given pixel, the incoupler may receive the output light at an incidence position on and an incidence angle relative to the incoupler based on the field position of the given pixel. In such examples, adjusting the output light to reduce the field position-dependent non-uniformities may comprise adjusting the output light based on the image correction map to reduce at least one of the intensity non-uniformity and the color balance non-uniformity of the image caused by variations in the incidence position and the incidence angle from one pixel to another.

Figure 6:
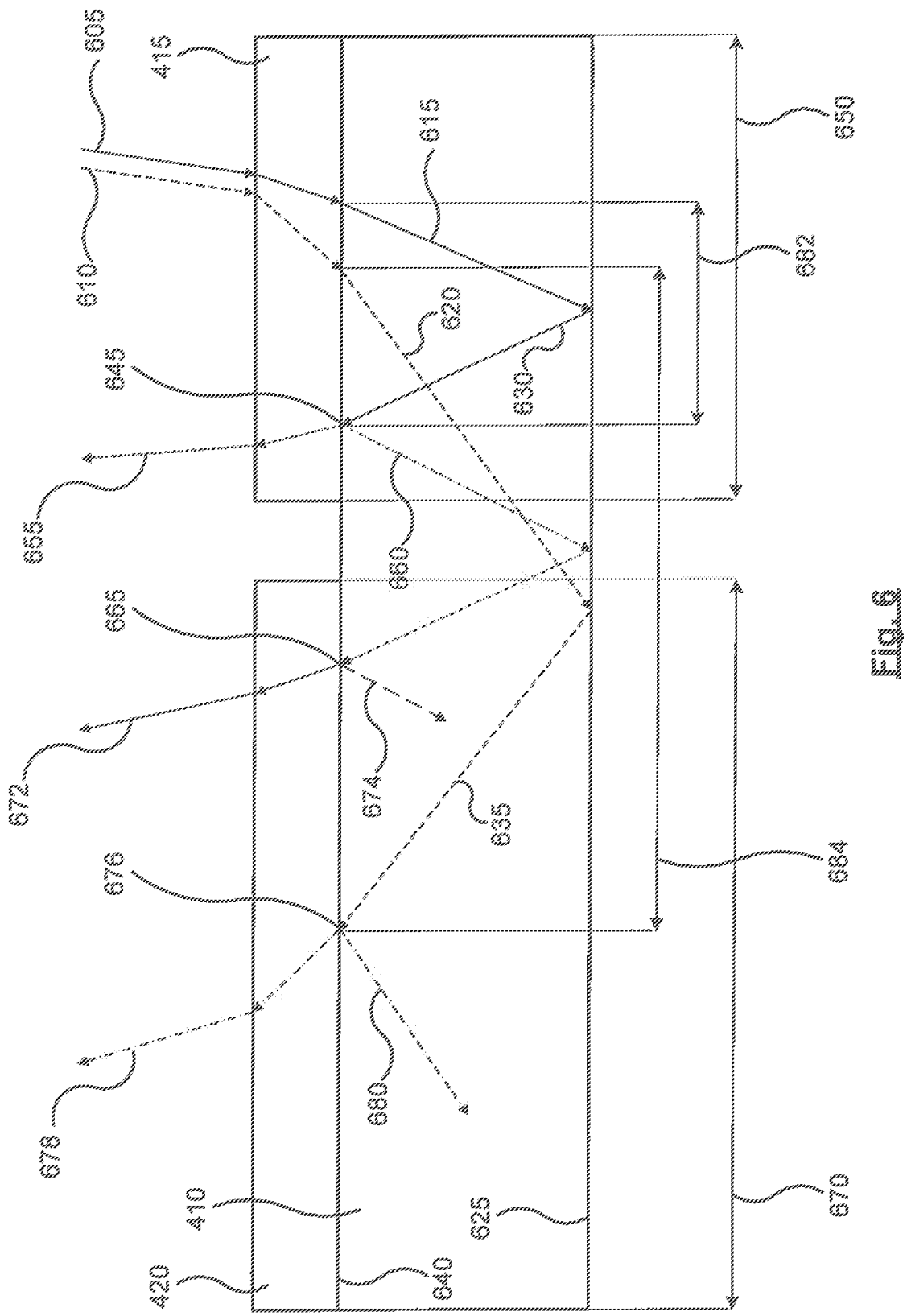
FIG. 6 shows a schematic, cross-sectional representation of the display optic shown in FIG. 4.

Moreover, in some example WHUDs, one display optic may be used to handle multiple colors of output light to form a color image. The optical performance of the display optic may be color-dependent. As such, image non-uniformities may also be caused by color-dependent variations in optical losses in the display optic. These losses may also contribute to non-uniformities in images formed using the display optic. FIG. 6 shows a schematic, cross-sectional representation of the display optic shown in FIG. 4. Similar to FIG. 5, FIG. 6 also shows the light guide, the incoupler, and the outcoupler as being planar (i.e. without their curvature as depicted in FIG. 4) for ease of illustration.

FIG. 6 shows input light beams 605 and 610 being incident upon incoupler 415. In some examples, beams 605 and 610 may be directed onto incoupler 415 by spatial modulator 220, as shown in FIG. 5. Beams 605 and 610 may have different wavelengths (i.e. different colors). While FIG. 6 shows beams 605 and 610 as being spaced from one another, it is contemplated that in some examples beams 605 and 610 may be coincident. In other words, in some examples beams 605 and 610 may be part of a single, multi-color output light beam.

Incoupler 415 may direct at least a portion of beams 605 and 610 into light guide 410 to form incoupled beams 615 and 620 respectively. Due to the difference in their wavelengths, incoupler 415 may direct beams 615 and 620 into light guide 410 at different angles. Beams 615 and 620 may be internally reflected by an inner surface 625 of light guide 410 to form a first reflected light beam 630 and a second reflective light beam 635 respectively.

Reflected light beam 630 is incident upon another internal surface 640 of light guide 410 at bounce position 645. Surface 640 may be partially internally reflective based on the angle of incidence of light beams upon it. Since incidence position 645 is within the length 650 of incoupler 415 (i.e. beam 630 is incident upon incoupler 415), reflected beam 630 may be partially outcoupled from light guide 410 by incoupler 415 to form lost beam 655. Lost beam 655 is described as "lost" since beam 655 leaves the display optic before it can reach outcoupler 420 and be directed towards the eye of the user to contribute to forming an image. Another portion of reflected beam 630 may be internally reflected back into light guide 410 to form reflected beam 660 which continues propagating in light guide 410 towards outcoupler 420. As lost beam 655 does not reach outcoupler 420 to be directed to an eye of a user, lost beam 655 represents an incoupling loss associated with beam 605.

Reflected beam 660 reflects from surface 625 and becomes incident upon surface 640 at incidence position 665, which is within the length 670 of outcoupler 420. In other words, at incidence position 665, beam 660 is incident upon outcoupler 420. A portion of beam 660 is outcoupled by outcoupler 420 to form beam 672 directed towards the eye of the user to form an image. Another portion of beam 660 may be internally reflected back into light guide 410 to form beam 674, which in turn propagates along light guide 410.

Reflected beam 635, in turn, propagates towards and becomes incident upon surface 640 at a second bounce position 676, at which position a portion of beam 635 is outcoupled by outcoupler 420 to form a beam 678 directed towards the eye of the user to form an image. Another portion of beam 635 may be internally reflected back into light guide 410 to form beam 680. As the bounce position 676 of reflected beam 635 is outside of length 650 of incoupler 415 and within length 670 of outcoupler 420, beam 635 does not experience an incoupling loss caused by incoupler 415 outcoupling a portion of beam 635 out of light guide 410.

In other words, the extent of incoupling losses of a given beam may be at least partly based on a bounce length of that beam within the light guide. The bounce length, in turn may be based on the angle at which the beam is directed into the light guide by the incoupler. This angle, in turn, may be a function of the wavelength of the beam. FIG. 6 shows a bounce length 682 associated with beam 605 and a bounce length 684 associated with beam 610. Bounce length 684 is longer than bounce length 682. The longer bounce length of beam 610 may allow it to avoid a bounce position within the length 650 of incoupler 415, thereby allowing beam 610 to avoid incoupling losses caused by incoupler 415 outcoupling a portion of beam 610 (or its associated beam 620) out of light guide 410.

In some examples, beams of a longer wavelength may have a correspondingly longer bounce length, and beams of a shorter wavelength may have relatively shorter bounce lengths. As such, the use of the display optic shown in FIGS. 4-6 to handle multiple wavelengths may cause wavelength-dependent incoupling losses, which may in turn cause color balance and intensity non-uniformities in the image formed using the display optic. These non-uniformities may be reduced or counteracted by using the 2D correction maps described herein to adjust the output light in a manner that at least partially counteracts the wavelength- or field position-dependent image non-uniformities such as those described in relation to FIGS. 5 and 6.

In other words, in some examples, the output light may comprise a plurality of wavelengths. The display optic may comprise a light guide and an incoupler carried by the light guide. The incoupler may receive the output light from the spatial modulator and direct at least a portion of the output light into the light guide. The light guide, in turn, may internally reflect the portion of the output light to form a reflected light. The output light may have or experience a plurality of incoupling losses corresponding to the plurality of wavelengths of the output light. The display optic may also comprise an outcoupler carried by the light guide. The outcoupler may direct at least a portion of the reflected light out of the light guide towards an eye of the user wearing the WHUD. In such examples, adjusting the output light may comprise adjusting the output light based on the image correction map to reduce at least one of the intensity non-uniformity and the color balance non-uniformity of the image caused by the incoupling losses.

Moreover, in some examples, the output light may comprise a first light having a first wavelength and a second light having a second wavelength. The incoupler may direct at least a portion of the first light and at least a portion of the second light into the light guide. The light guide in turn may internally reflect the portion of the first light and the portion of the second light to form a first reflected light and a second reflected light respectively. Furthermore, the first reflected light may be incident upon a reflective surface of at least one of the incoupler and the light guide at a first bounce position, and the second reflected light may be incident upon the reflective surface of at least one of the incoupler and the light guide at a second bounce position. The first light may have a first incoupling loss based on the first bounce position and the second light may have a second incoupling loss based on the second bounce position. In such examples, adjusting the output light may comprise adjusting the output light based on the image correction map to reduce at least one of the intensity non-uniformity and the color balance non-uniformity of the image caused by a difference between the first incoupling loss and the second incoupling loss.

In addition, while FIG. 6 shows two beams 605, 610 having different wavelengths, it is contemplated that in some examples three or more different colors of light may be used to form an image. In some examples, red, green, and blue beams of light may be used to form a color image.

FIG. 7 in turn shows example first level 2D correction maps 705, 710, and 715 that may be used to adjust the output light to reduce or counteract intensity or color balance non-uniformities across the field of an image. These maps are 2×2, in alignment with the example 2×2 field shown in FIG. 5. It is contemplated that these maps may have different dimensions corresponding to example fields that may have dimensions other than 2×2. Each of the maps are for a corresponding color: map 705 may be used to adjust the red output light, map 710 to adjust the green output light, and map 715 to adjust the blue output light. In examples where different numbers or colors of output lights are used to form the image, the number of the first level 2D correction maps may also be different.

Referring to map 705, the pixels are labelled using R1, R2, R3, and R4. The value in brackets in each pixel may correspond to an adjustment that is to be made to the intensity of the red output light when that given pixel is to be projected. For example, (+1) may indicate a one unit increase in intensity of red, whereas (−5) may indicate a five unit decrease. Maps 710 and 715 are labelled in a manner analogous to map 705. The actual correction values shown in the maps are for illustrative purposes, and it is contemplated that other values may also be used. In addition, the corrections in the maps are presented as additions to or subtractions from the intensity. It is contemplated that in some examples, the adjustments to the output light may be other than additions to or subtractions from intensity.

Figure 8:
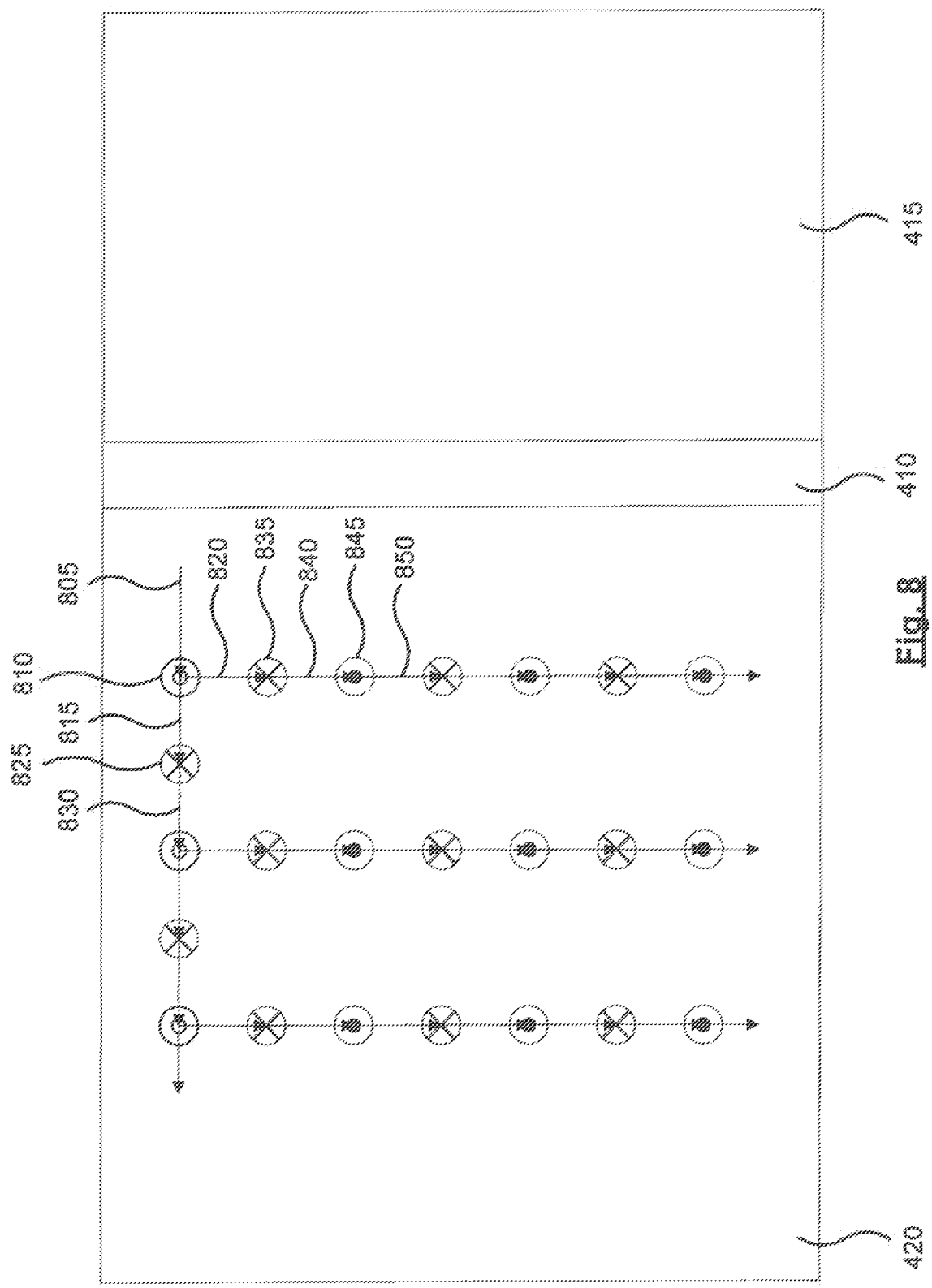
FIG. 8 shows a top plan view of an example display optic, in accordance with a non-limiting implementation of the present specification.

As discussed above, in addition to non-uniformities across the field of an image, the user may also perceive variations or non-uniformities in the intensity or color balance of the image as the position of the pupil of the eye of the user changes within the eyebox of the WHUD. FIG. 8 shows an example scheme for generating a plurality of exit pupils (EPs), which span across at least a portion of the eyebox and allow the user to view the image when the user's pupil is in a plurality of different positions in the eyebox.

FIG. 8 shows a top plan view of a display optic that is similar to those shown in FIGS. 4-6. The display optic comprises light guide 410, and incoupler 415 and outcoupler 420 carried on light guide 410. The display optic of FIG. 8 may also comprise an exit pupil expander (EPE) in addition to outcoupler 420. In some examples, outcoupler 420 itself may perform the functions of the EPE. For the purposes of this description, a combined outcoupler (OC)-EPE (OC/EPE) is described as performing the functions of both the outcoupler and the EPE.

The OC/EPE receives a beam 805 of light from light guide 410. Beam 805 may be part of the output light that was generated by the light source of the WHUD and received at incoupler 415, which in turn incoupled beam 805 into light guide 410. Beam 805 may be incident upon the OC/EPE at incidence position 810. For beams propagating in a first direction (i.e. the direction of beam 805), the OC/EPE may split the beam into a first partial beam 815 propagating in the first direction and a second partial beam 820 propagating in a second direction which is different than the first direction. Beams 815 and 820 may be described as daughter beams of beam 805. Incidence position 810 is denoted by two concentric unfilled circles in FIG. 8. This symbol is used to indicate incidence positions on the OC/EPE at which position the incoming beam is split into two partial sister beams propagating in different directions.

Beam 815, in turn, may propagate towards light guide 410 and be reflected from light guide 410 at incidence position 825, to form beam 830 propagating towards OC/EPE. Incidence position 825 is denoted by a cross within a circle in FIG. 8. This symbol is used to indicate incidence positions on the light guide at which positions the incoming beam is reflected back towards the OC/EPE.

Beam 820, in turn, may propagate towards light guide 410 and be reflected from light guide 410 at incidence position 835, to form beam 840 propagating towards OC/EPE. Beam 840 may be incident on the OC/EPE at an incidence position 845. For beams incident upon OC/EPE which are propagating in the second direction of beam 840, the OC/EPE may outcouple a first portion of the beam while allowing a second portion of the beam to continue towards the light guide 410. This second portion may be described as beam 850.

Figure 9:
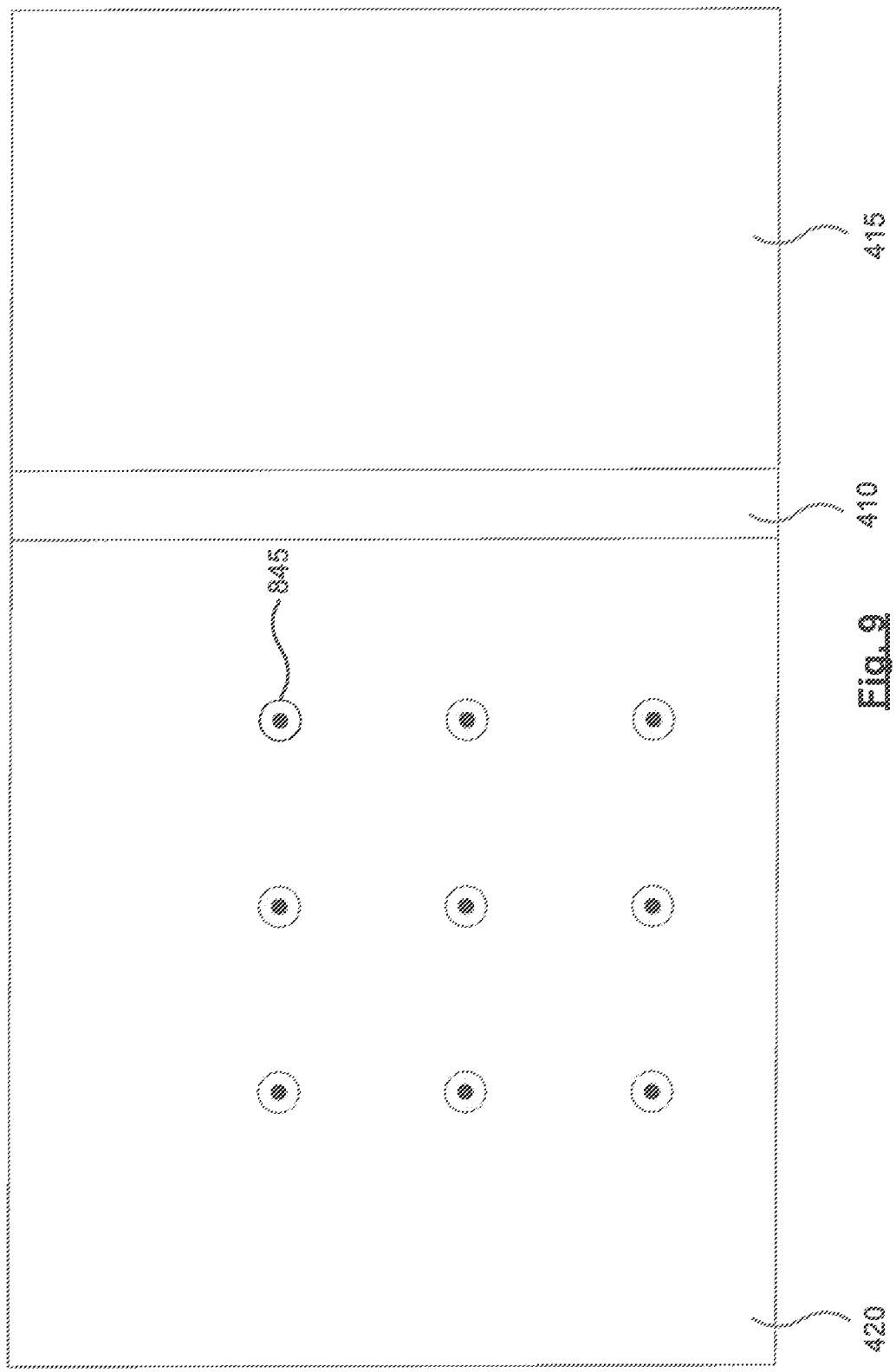
FIG. 9 shows the display optic of FIG. 8 and illustrates an array of exit pupils also shown in FIG. 8.

Incidence position 845 is denoted by two concentric circles in FIG. 8, the inner circle being filled and the outer circle being unfilled. This symbol is used to indicate incidence positions on the OC/EPE at which positions the incoming beam is split into two partial beams, one being outcoupled and directed towards the eye of the user, and the second propagating towards the light guide. Each incidence position on the OC/EPE where light is outcoupled towards the eye of the user may form an EP. In other words, the incidence positions denoted by filled and unfilled concentric circles may represent EPs. FIG. 9 depicts the display optic of FIG. 8, and illustrates the array of EPs shown in FIG. 8.

In addition, while FIG. 8 shows nine EPs (i.e. nine incidence positions denoted by concentric filled and unfilled circles), the daughter beams may continue to propagate across the OC/EPE and create additional EPs until the daughter beams reach the physical edges of the OC/EPE. Moreover, it is contemplated that in some examples, schemes or methods other than those described in relation to FIG. 8 may be used to generate an array of EPs.

Returning to FIG. 8, as beam 805 and its daughter beams propagate across the OC/EPE, a grid or array of EPs may be formed. As shown in FIG. 8, the incoming beam is split, and its intensity is reduced, at both incidence positions that are denoted by two concentric unfilled circles and at incidence positions denoted by filled and unfilled concentric circles. As such, the larger the number of such incidence positions between a given EP and the initial incidence position 810, the lower will be the intensity of light at that given EP.

Figure 10:
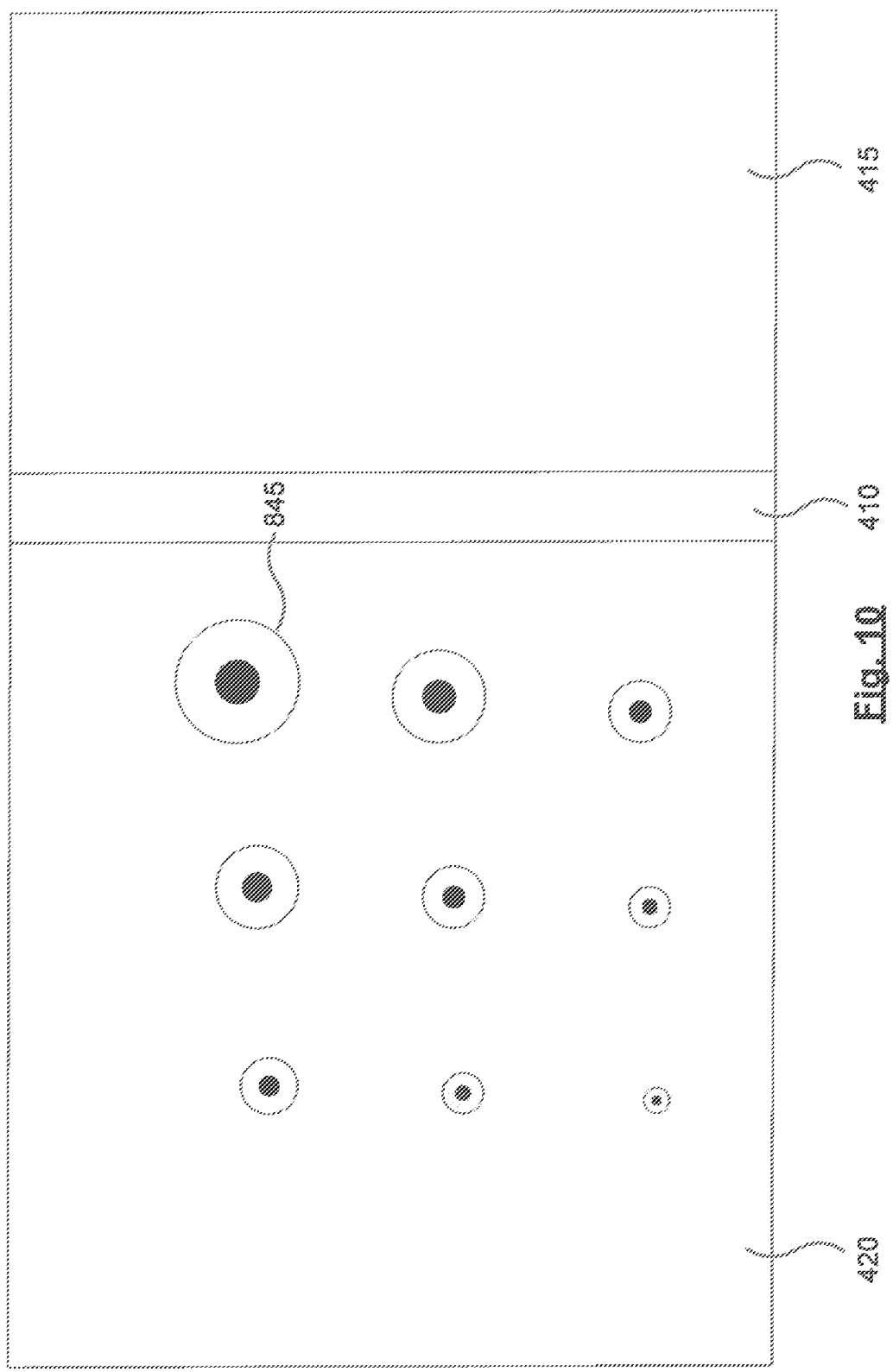
FIG. 10 shows another representation of the display optic and the array of exit pupils of FIG. 9.

FIG. 10 shows the display optic and the array of EPs of FIG. 9, with a difference being that in FIG. 10 the diameter of the symbols denoting the EPs are adjusted to reflect the relative intensities at those EPs. In other words, in FIG. 10 the relatively larger symbols denoting the EPs indicate the relatively higher intensity or brighter EPs.

Figure 11:
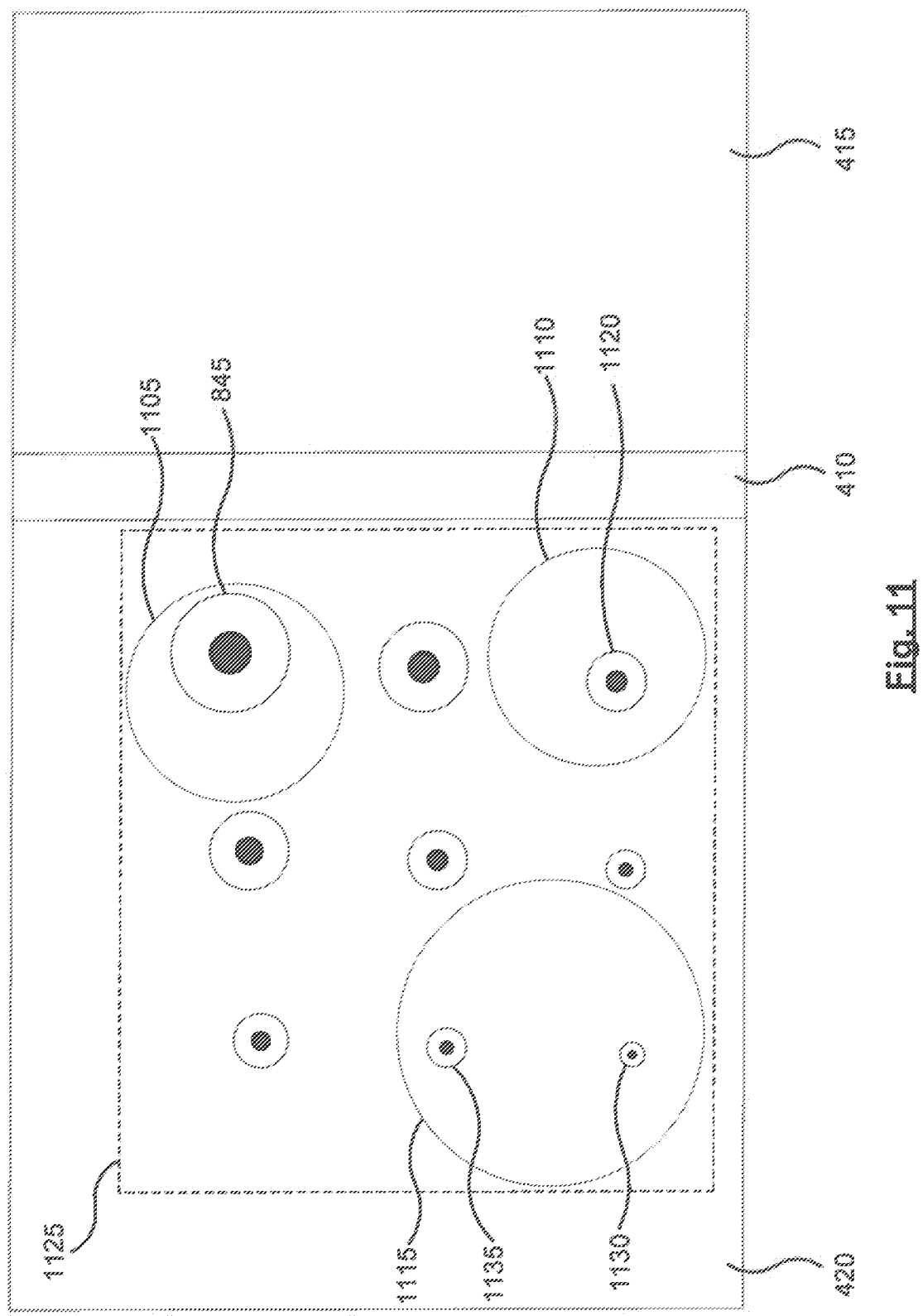
FIG. 11 shows another representation of the display optic and the array of exit pupils shown in FIG. 10, in accordance with a non-limiting implementation of the present specification.

FIG. 11, in turn, shows the display optic and the array of EPs shown in FIG. 10. Dashed circles show some example possible positions 1105, 1110, and 1115 of the pupil of a user wearing the WHUD that uses the display optic of FIG. 11. The relative sizes of the dashed circles also signify the relative sizes of the pupil at each of the positions 1105, 1110, and 1115, relative to the sizes of the pupil at the other positions 1105, 1110, and 1115. At pupil position 1105, the EP at incidence position 845 enters the pupil of the eye. At pupil position 1110, in turn, the EP at incidence position 1120 enters the eye. As shown in FIG. 11, the EP at position 845 is brighter than the EP at position 1120. As such, as the position of the pupil of the user's eye moves in eyebox 1125 from position 1105 to position 1110, the user may perceive a change in the intensity of the image formed by the display optic of FIG. 11.

In some examples, the pupil position relative to eyebox 1125 may change due to reasons including the user changing the direction of the user's gaze, the WHUD moving or being adjusted relative to the face or eye of the user, and the like. As discussed above, these changes in pupil position may change the EP(s) that enter the pupil, thereby causing changes in the intensity or other characteristics of the image perceived by the user. The second level of 2D correction maps described herein may allow for taking these pupil position-dependent changes into account when selecting the appropriate first level 2D correction map to adjust the output light to reduce the image non-uniformities.

Figure 12:
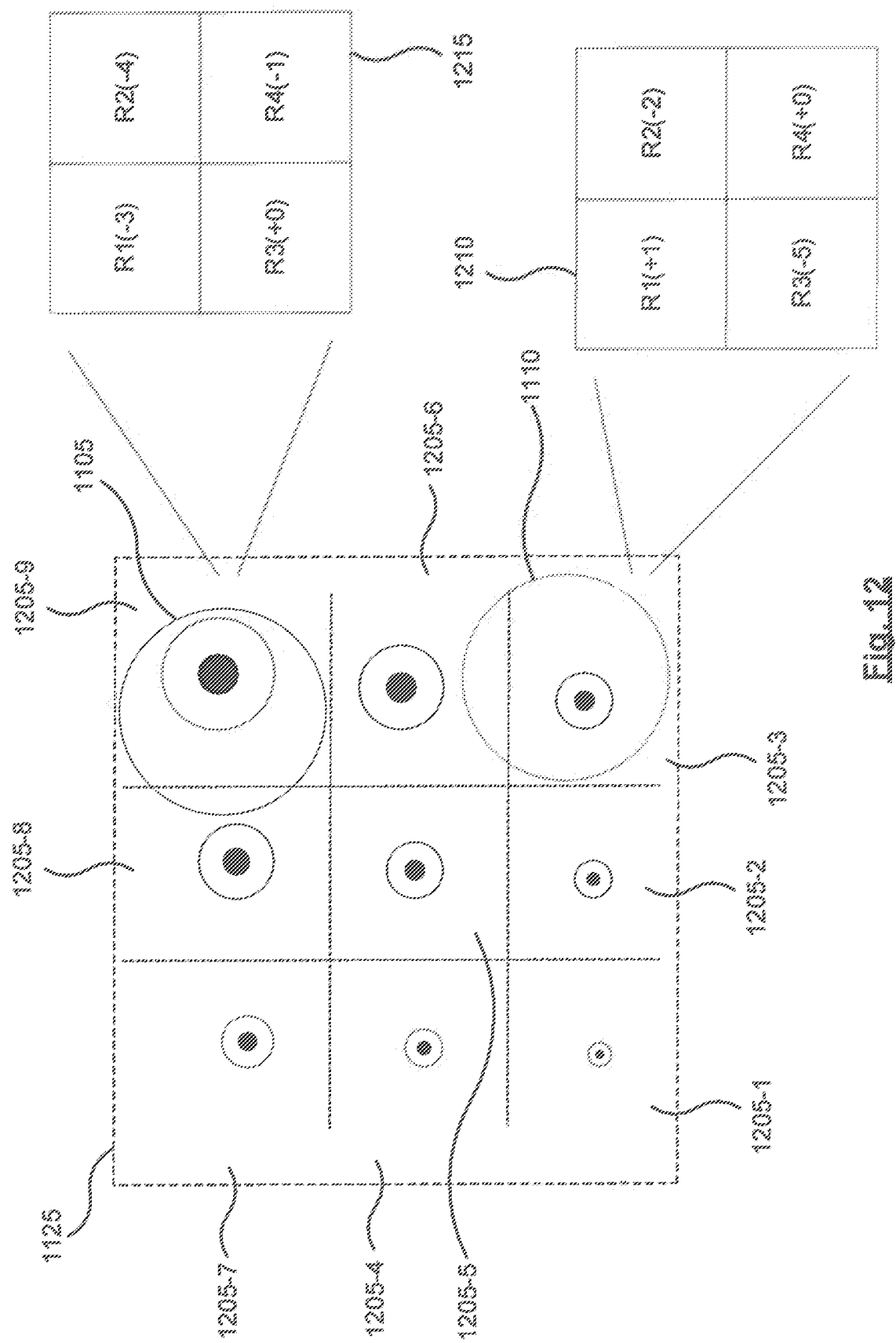
FIG. 12 shows a representation of an eyebox shown in FIG. 11, in accordance with a non-limiting implementation of the present specification.

FIG. 12 shows eyebox 1125 divided into an array of nine positions 1205-1, 1205-2, 1205-3, 1205-4, 1205-5, 1205-6, 1205-7, 1205-8, and 1205-9 (collectively referred to as positions 1205). This array may also be described as a 3×3 second level 2D correction map. Each of the positions 1205 in this second level 2D map may have a corresponding first level 2D correction map. For example, position 1205-3 may have a corresponding first level correction map 1210, and position 1205-9 may have a corresponding first level correction map 1215. While not shown in FIG. 12, the other positions 1205 may also have corresponding first level correction maps.

Correction map 1210 is shown as a 2×2 array in alignment with the 2×2 image field shown in FIG. 5 and the 2×2 correction maps shown in FIG. 7. In some examples, map 1210 may be similar to map 705 shown in FIG. 7. The corrections or adjustments indicated by map 1215 may be different than those of map 1210, to account for the differences in image non-uniformities at position 1205-3 comparted to those at position 1205-9.

In operation, in order to reduce or counteract the image intensity or color balance non-uniformities using the first and second level 2D correction maps, the position of the pupil in the eyebox is obtained. For example, this position may be pupil position 1110. Based on this position 1110, the second level 2D map may be consulted to determine which first level map is to be used. In the example second level map shown in FIG. 12, based on position 1110, first level 2D map 1210 is selected, which map is associated with position 1205-3 in the second level 2D map. The first level 2D map 1210 may then be used to adjust the output light to reduce or counteract the image non-uniformities.

In some examples, if the pupil position and size overlap multiple positions in the second level 2D map, a closest or most representative second level 2D map position may be selected, and the corresponding first level 2D map may then be used to adjust the output light. Moreover, in some examples, if the pupil position and size overlap multiple positions in the second level 2D map, the first level 2D maps associated with the multiple positions may be averaged or otherwise combined to form a new first level 2D map corresponding to the pupil position.

While FIG. 12 shows the eyebox divided into a 3×3 array for the purposes of the second level 2D map, it is contemplated that in some examples the eyebox may be divided into an array of positions having a different size or dimensions. In addition, FIG. 12 shows examples of the first level 2D maps only for the red component of the input light. It is contemplated that in some examples each of the positions 1205 of the second level 2D map may be associated with multiple first level 2D maps, each corresponding to a color of the input light. For example, position 1205-3 may be associated with first level 2D maps for green and blue as well as red. The same may be true for the other positions 1205.

Referring back to FIG. 11, while the circles at positions 1105 and 1110 are the same size, the circle at position 1115 is shown as being relatively larger. The relative sizes of these circles represent the relative sizes of the pupil of the user. At position 1115, the pupil may be dilated, which may in turn allow multiple EPs to enter the pupil. In FIG. 11, EPs at incidence positions 1130 and 1135 may enter the pupil. As such, in addition to the position of the pupil relative to eyebox 1125, the size of the pupil may also determine which EPs enter the pupil, which in turn may impact the intensity or other characteristics of the image perceived by the user.

Such a larger pupil size may increase the likelihood of the position and size overlapping multiple positions 1205 in the second level 2D map. As discussed above, in some examples, such overlapping situations may be addressed by selecting a representative position and its associated first level 2D map, or by averaging or otherwise combining first level 2D maps associated with the positions in the second level 2D map involved in the overlap. It is contemplated that in some examples other methods of addressing the overlap situations may also be used.

As the pupil size may impact the image non-uniformities perceived by the user, in some examples obtaining the image correction map may comprise obtaining the image correction map further based on an indication of a size of the pupil. In some examples, instead of obtaining the pupil size itself, a proxy or an indication of the pupil size may be obtained. For example, the proxy or indication of the size of the pupil may comprise an ambient brightness. A higher ambient brightness my indicate or correspond to a smaller pupil size, and a lower ambient brightness may indicate or correspond to a dilated or larger pupil size. In such examples, obtaining the image correction map may be further based on the ambient brightness.

Referring back to FIGS. 8 and 9, the array of EPs shown in these Figures is the EP array corresponding to one color of the output light at one field position (i.e. pixel). For different colors at the same field position, both the initial incidence position on the OC/EPE and the spacing of the EPs in the array may be different. Furthermore, for different field positions in the field of the image (i.e. for different pixels), the position and spacing of the EPs may also be different. As such, multiple arrays of EPs, with potentially different positions or spacings in the eyebox, may be contained in the eyebox for the different colors of the input light and the different field positions of the image. The first and second level 2D correction maps described herein may account for the non-uniformities caused by this multitude of EP arrays.

In some examples, a region of interest in the image may be obtained, which region of interest may correspond to the gaze of the user. In other words, the gaze of the user may be used to determine a region of interest in the image. In such examples, adjusting the output light based on the image correction map may comprise adjusting the output light based on the image correction map to reduce at least one of the intensity non-uniformity and the color balance non-uniformity in the region of interest of the image.

For example, referring to FIG. 12 and map 1210, it may be determined that the user is gazing at a region of interest comprising the right half of the field of the image. The output light may be adjusted for pixels R2 and R4 which comprise the right side of the field of the image to reduce image non-uniformities in the region of interest (i.e. the right side of the image), while pixels R1 and R2 may be left uncorrected. This region-selective image correction may reduce the time and computational resources used to reduce or counteract image non-uniformities.

As discussed above, in some examples adjusting the output light may comprise controlling the light source to adjust an intensity of the output light. Moreover, in some examples, adjusting the output light may comprise adjusting a polarization of the output light. In some examples, adjusting the polarization may allow for polarization-based adjustments of intensity, such as using polarization based filters and the like.

In addition, in some examples where the WHUD forms color images, the light source may comprise a red light source, a green light source, and a blue light source. For example, the light source may comprise red, green, and blue lasers. In such examples, the adjusting the output light may comprise controlling at least one of the red light source, the green light source, and the blue light source to adjust an intensity of a corresponding red output light, a green output light, and a blue output light respectively.

Furthermore, in some examples, the WHUD may be operated to display a plurality of corrected test images to the user. User input may then be received, which input may be used to select a given corrected test image from the plurality of corrected test images. In such examples, obtaining the image correction map may comprise determining the image correction map corresponding to the given corrected test image.

In other words, the user may participate in calibrating the WHUD by selecting the corrected test image that is perceived by the user as representing the best or most effective non-uniformity corrections. These selected test images may then be used to back-calculate the first or second level 2D correction maps. In some examples, these user-selected test images may be used to train or refine a machine learning model used to generate the correction maps or to correct the image non-uniformities.

As shown in FIGS. 2 and 3, in some examples the functions and methods described herein may be performed by a WHUD which comprises a controller, such as controller 230. In such examples, generating the output light may comprise the controller controlling the light source to generate the output light. Moreover, receiving the position of the pupil may comprise receiving the position of the pupil at the controller. Furthermore, obtaining the image correction map may comprise obtaining the image correction map by the controller. In addition, adjusting the output light may comprise the controller controlling the light source to adjust the output light.

As discussed above, method 100 and the other methods described herein may be performed by the display systems, such as WHUDs, described herein. Referring back to FIGS. 2 and 3, in some examples the WHUD may comprise light source 210 to generate output light 215. The WHUD may also comprise spatial modulator 220 to receive the output light from light source 210. In addition, the WHUD may comprise display optic 225 to receive output light 215 from spatial modulator 220 and direct the output light towards eye 205 of a user of the WHUD to form an image viewable by the user.

The WHUD may also comprise controller 230 in communication with light source 210 and the spatial modulator 220. Controller 230 may receive a position of a pupil of the user relative to an eyebox of the WHUD worn by the user, and obtain an image correction map based on the position of the pupil. Controller 230 may also adjust output light 215 based on the image correction map to reduce at least one of an intensity non-uniformity and a color balance non-uniformity of the image.

In some examples, to receive the position of the pupil controller 230 may receive gaze position information of a gaze of the eye of the user. Moreover, in some examples, controller 230 may receive the gaze position from gaze tracking module 235. In addition, in some examples, controller 230 may receive an indicator of a region of interest in the image corresponding to the gaze. To adjust the output light based on the image correction map, controller 230 may adjust the output light based on the image correction map to reduce at least one of the intensity non-uniformity and the color balance non-uniformity in the region of interest of the image.

Moreover, in some examples, to obtain the image correction map controller 230 may retrieve the image correction map from a repository storing a plurality of image correction maps in association with corresponding positions of the pupil relative to the eyebox. Furthermore, in some examples, to obtain the image correction map controller 230 may calculate the image correction map based on the position of the pupil.

In addition, in some examples, to adjust the output light controller 230 may control the light source to adjust an intensity of the output light. In some examples, light source 210 may comprise a red light source, a green light source, and a blue light source. To adjust output light 215 controller 230 may control at least one of the red light source, the green light source, and the blue light source to adjust an intensity of a corresponding red output light, a green output light, and a blue output light respectively. Moreover, in some examples, to adjust the output light 215 controller 230 may adjust a polarization of the output light.

Furthermore, in some examples, to obtain the image correction map controller 230 may obtain the image correction map further based on an indication of a size of the pupil. In some examples, ambient brightness may be used as the indication of the size of the pupil. Moreover, in some examples controller 230 may obtain the ambient brightness from ambient brightness sensor 240.

In some examples, controller 230 may control light source 210 and spatial modulator 220 to display a plurality of corrected test images to the user. Controller 230 may also receive user input selecting a given corrected test image from the plurality of corrected test images. To obtain the image correction map controller 230 may determine the image correction map corresponding to the given corrected test image.

Moreover, in some examples, light source 210 may comprise one or more laser light sources, and spatial modulator 220 may comprise a scan mirror. In addition, in some examples, light source 210 and spatial modulator 220 may be parts of a laser projector. Furthermore, in some examples, output light 215 may comprise a plurality of wavelengths.

Referring to FIGS. 4-6, In some examples display optic 225 may comprise light guide 410, and incoupler 415 and outcoupler 420 carried by light guide 410. Incoupler 415 may receive output light 215 from spatial modulator 220 and direct at least a portion of the output light into light guide 410. Light guide 410, in turn, may internally reflect the portion of the output light to form a reflected light. The output light may have a plurality of incoupling losses corresponding to the plurality of wavelengths of the output light. Outcoupler 420 may direct at least a portion of the reflected light out of light guide 410 towards eye 205 of the user wearing the WHUD. To adjust output light 215 controller 230 may adjust output light 215 based on the image correction map to reduce at least one of the intensity non-uniformity and the color balance non-uniformity of the image caused by the incoupling losses.

In some examples, output light 215 may comprise a first light having a first wavelength and a second light having a second wavelength. Incoupler 415 may direct at least a portion of the first light and at least a portion of the second light into light guide 410, which may internally reflect the portion of the first light and the portion of the second light to form a first reflected light and a second reflected light respectively. The first reflected light may be incident upon a reflective surface of at least one of incoupler 415 and light guide 410 at a first bounce position, and the second reflected light may be incident upon the reflective surface of at least one of incoupler 415 and light guide 410 at a second bounce position. The first light may have a first incoupling loss based on the first bounce position and the second light may have a second incoupling loss based on the second bounce position. An example of bounce position-dependent incoupling losses is described in relation to FIG. 6.

In such examples, to adjust output light 215 controller 230 may adjust output light 215 based on the image correction map to reduce at least one of the intensity non-uniformity and the color balance non-uniformity of the image caused by a difference between the first incoupling loss and the second incoupling loss.

Furthermore, in some examples, the image may comprise a plurality of pixels. Each pixel may have a corresponding field position comprising spatial coordinates of the pixel in the image. For each given pixel, incoupler 415 may receive output light 215 at an incidence position on and an incidence angle relative to incoupler 415 based on the field position of the given pixel. An example of such field position dependent incidence positions and angles are described in relation to FIG. 5. In such examples, to adjust output light 215 controller 230 may adjust output light 215 based on the image correction map to reduce at least one of the intensity non-uniformity and the color balance non-uniformity of the image further caused by variations in the incidence position and the incidence angle from one pixel to another.

In addition, referring to FIGS. 2-4, in some examples a WHUD may comprise light source 210 to generate output light 215 comprising a plurality of wavelengths. Output light 215 may be used to form an image. The WHUD may also comprise spatial modulator 220 to receive output light 215 from light source 210. In addition, the WHUD may comprise light guide 410, and incoupler 415 and outcoupler 420 carried by light guide 410.

Incoupler 415 may receive output light 215 from spatial modulator 220 and direct at least a portion of output light 215 into light guide 410. Light guide 410 may internally reflect the portion of output light 215 to form a reflected light. Output light 215 may have a plurality of incoupling losses corresponding to the plurality of wavelengths of the output light. Outcoupler 420 may direct at least a portion of the reflected light out of light guide 410 towards an eye of a user wearing the WHUD.

The WHUD may also comprise a controller 230 in communication with light source 210 and spatial modulator 220. Controller 230 may obtain an image correction map, and adjust output light 215 based on the image correction map to reduce at least one of an intensity non-uniformity and a color balance non-uniformity of the image caused by the incoupling losses.

In some examples, output light 215 may comprise a first light having a first wavelength and a second light having a second wavelength. Incoupler 415 may direct at least a portion of the first light and at least a portion of the second light into light guide 410. Light guide 410 may internally reflect the portion of the first light and the portion of the second light to form a first reflected light and a second reflected light respectively. The first reflected light may be incident upon a reflective surface of at least one of incoupler 415 and light guide 410 at a first bounce position, and the second reflected light may be incident upon the reflective surface of at least one of incoupler 415 and light guide 410 at a second bounce position. The first light may have a first incoupling loss based on the first bounce position and the second light may have a second incoupling loss based on the second bounce position. An example of bounce position-dependent incoupling losses is described in relation to FIG. 6.

In such examples, controller 230 may adjust output light 215 based on the image correction map to reduce at least one of intensity non-uniformity and the color balance non-uniformity of the image caused by a difference between the first incoupling loss and the second incoupling loss.

In addition, in some examples, the image may comprise a plurality of pixels. Each pixel may have a corresponding field position comprising spatial coordinates of the pixel in the image. For each given pixel, incoupler 415 may receive output light 215 at an incidence position on and an incidence angle relative to incoupler 415 based on the field position of the given pixel. An example of such field position dependent incidence positions and angles are described in relation to FIG. 5.

In such examples, controller 230 may adjust output light 215 based on the image correction map to reduce at least one of the intensity non-uniformity and the color balance non-uniformity of the image further caused by variations in the incidence position and the incidence angle from one pixel to another.

It is contemplated that method 100 and the other methods described herein may be performed by system 200, WHUD 300, and the other systems and devices described herein. It is also contemplated that method 100 and the other methods described herein may be performed by systems or devices other than the systems and devices described herein. In addition, it is contemplated that system 200, WHUD 300, and the other systems and devices described herein may have the features and perform the functions described herein in relation to method 100 and the other methods described herein. Moreover, system 200, WHUD 300, and the other systems and devices described herein may have features and perform functions other than those described herein in relation to method 100 and the other methods described herein.

Moreover, while FIG. 4 shows a given display optic having a given arrangement of light guide, incoupler, and outcoupler, it is contemplated that in some examples the display optic may have a different structure, and that the light guide, incoupler, and outcoupler may be arranged differently relative to one another. In addition, while some of the examples provided herein are described in the context of laser projectors and WHUDs, it is contemplated that the functions and methods described herein may be implemented in or by display systems or devices which may not use laser projectors or be WHUDs.

Throughout this specification and the appended claims, infinitive verb forms are often used. Examples include, without limitation: "to form," "to reduce," "to adjust," "to generate," and the like. Unless the specific context requires otherwise, such infinitive verb forms are used in an open, inclusive sense, that is as "to, at least, form," to, at least, reduce," "to, at least, adjust," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operating a wearable heads-up display (WHUD), the WHUD comprising a light source, a spatial modulator, and a display optic, the method comprising:
   generating, by the light source, an output light comprising a plurality of wavelengths and having a plurality of incoupling losses corresponding to the plurality of wavelengths, the output light to form an image viewable by a user of the WHUD, the output light comprising a first light having a first wavelength and a second light having a second wavelength;
   receiving a position of a pupil of the user relative to an eyebox of the WHUD;
   obtaining an image correction map from a plurality of image correction maps based on the position of the pupil; and
   adjusting the output light to form an adjusted output light, the adjusted output light adjusted based on the image correction map to reduce at least one of an intensity non-uniformity and a color balance non-uniformity of the image caused by a difference between a first incoupling loss of the plurality of incoupling losses and a second incoupling loss of the plurality of incoupling losses.

2. The method of claim 1, wherein the receiving the position of the pupil comprises tracking a gaze of a corresponding eye of the user, and the method further comprising:

obtaining a region of interest in the image corresponding to the gaze; and wherein:
the adjusting the output light based on the image correction map comprises adjusting the output light based on the image correction map to reduce at least one of the intensity non-uniformity and the color balance non-uniformity in the region of interest of the image.

3. The method of claim 1, wherein the obtaining the image correction map comprises at least one of:
retrieving the image correction map from a repository storing a plurality of image correction maps in association with corresponding positions of the pupil relative to the eyebox; and/or
calculating the image correction map based on the position of the pupil.

4. The method of claim 1, wherein the adjusting the output light comprises at least one of controlling the light source to adjust an intensity of the output light and/or adjusting a polarization of the output light.

5. The method of claim 1, wherein:
the obtaining the image correction map comprises obtaining the image correction map further based on an indication of a size of the pupil;
the indication of the size of the pupil comprises an ambient brightness; and
the obtaining the image correction map further based on the indication of the size of the pupil comprises obtaining the image correction map further based on the ambient brightness.

6. The method of claim 1, further comprising:
operating the WHUD to display a plurality of corrected test images to the user; and
receiving user input selecting a given corrected test image from the plurality of corrected test images; and wherein:
the obtaining the image correction map comprises determining the image correction map corresponding to the given corrected test image.

7. The method of claim 1, wherein:
the image comprises a plurality of pixels, each pixel having a corresponding field position comprising spatial coordinates of the pixel in the image;
for each given pixel, an incoupler is to receive the output light at an incidence position on and an incidence angle relative to the incoupler based on the field position of the given pixel; and
the adjusting the output light comprises adjusting the output light based on the image correction map to reduce at least one of the intensity non-uniformity and the color balance non-uniformity of the image further caused by variations in the incidence position and the incidence angle from one pixel to another.

8. The method of claim 1, wherein each image correction map of the plurality of image correction maps is associated with a corresponding position defining a portion of the eyebox and comprises output light adjustment information associated with the portion of the eyebox.

9. A wearable heads-up display (WHUD) comprising:
a light source to generate an output light comprising a plurality of wavelengths and having a plurality of incoupling losses corresponding to the plurality of wavelengths;
a spatial modulator to receive the output light from the light source;
a display optic to receive the output light from the spatial modulator and direct the output light towards an eye of a user of the WHUD to form an image viewable by the user; and
a controller in communication with the light source and the spatial modulator, the controller to:
receive a position of a pupil of the user relative to an eyebox of the WHUD;
obtain an image correction map from a plurality of image correction maps based on the position of the pupil; and
adjust the output light to form an adjusted output light, the adjusted output light adjusted based on the image correction map to reduce at least one of an intensity non-uniformity and a color balance non-uniformity of the image caused by a difference between a first incoupling loss of the plurality of incoupling losses and a second incoupling loss of the plurality of incoupling losses.

10. The WHUD of claim 9, wherein to receive the position of the pupil the controller is to receive gaze position information of a gaze of the eye of the user, and wherein the WHUD further comprises:
a gaze tracking module to track the gaze of the eye of the user, the gaze tracking module in communication with the controller; and wherein:
to receive the position of the pupil the controller is to receive the gaze position information from the gaze tracking module.

11. The WHUD of claim 10, wherein:
the controller is to receive an indicator of a region of interest in the image corresponding to the gaze; and
to adjust the output light based on the image correction map the controller is to adjust the output light based on the image correction map to reduce at least one of the intensity non-uniformity and the color balance non-uniformity in the region of interest of the image.

12. The WHUD of claim 9, wherein:
to obtain the image correction map the controller is to obtain the image correction map further based on an indication of a size of the pupil;
the indication of the size of the pupil comprises an ambient brightness; and
to obtain the image correction map further based on the indication of the size of the pupil the controller is to obtain the image correction map further based on the ambient brightness.

13. The WHUD of claim 12, further comprising:
an ambient brightness sensor in communication with the controller, the ambient brightness sensor to sense the ambient brightness and to communicate the ambient brightness to the controller.

14. The WHUD of claim 9, wherein the controller is further to:
control the light source and the spatial modulator to display a plurality of corrected test images to the user; and
receive user input selecting a given corrected test image from the plurality of corrected test images; and wherein:
to obtain the image correction map the controller is to determine the image correction map corresponding to the given corrected test image.

15. The WHUD of claim 9, wherein:
the image comprises a plurality of pixels, each pixel having a corresponding field position comprising spatial coordinates of the pixel in the image;

for each given pixel, an incoupler is to receive the output light at an incidence position on and an incidence angle relative to the incoupler based on the field position of the given pixel; and to adjust the output light the controller is to adjust the output light based on the image correction map to reduce at least one of the intensity non-uniformity and the color balance non-uniformity of the image further caused by variations in the incidence position and the incidence angle from one pixel to another.

16. The WHUD of claim 9, wherein each image correction map of the plurality of image correction maps is associated with a corresponding position defining a portion of the eyebox and comprises output light adjustment information associated with the portion of the eyebox.

17. A wearable heads-up display (WHUD) comprising:
a light source to generate an output light comprising a plurality of wavelengths and having a plurality of incoupling losses corresponding to the plurality of wavelengths, the output light to form an image;
a spatial modulator to receive the output light from the light source;
a light guide;
an incoupler carried by the light guide;
an outcoupler carried by the light guide; and
a controller in communication with the light source and the spatial modulator, the controller to:
obtain an image correction map from a plurality of image correction maps based on a position of a pupil of a user relative to an eyebox of the WHUD being worn by the user, wherein each image correction map of the plurality of image correction maps is associated with a position defining a portion of the eyebox; and
adjust the output light based on the image correction map to reduce at least one of an intensity non-uniformity and a color balance non-uniformity of the image caused by a difference between a first incoupling loss of the plurality of incoupling losses based on a first light bounce position at one or more of the incoupler or light guide and a second incoupling loss of the plurality of incoupling losses based on a second light bounce position at one or more of the incoupler or light guide.

18. The WHUD of claim 17, wherein:
the output light comprises a first light having a first wavelength and a second light having a second wavelength; and
the incoupler is to direct at least a portion of the first light and at least a portion of the second light into the light guide, the light guide to internally reflect the portion of the first light and the portion of the second light to form a first reflected light and a second reflected light, respectively, the first reflected light incident upon a reflective surface of at least one of the incoupler and the light guide at the first light bounce position and the second reflected light incident upon the reflective surface of at least one of the incoupler and the light guide the second light bounce position, the first light having the first incoupling loss based on the first light bounce position and the second light having the second incoupling loss based on the second light bounce position.

19. The WHUD of claim 17, wherein:
the image comprises a plurality of pixels, each pixel having a corresponding field position comprising spatial coordinates of the pixel in the image;
for each given pixel, the incoupler is to receive the output light at an incidence position on and an incidence angle relative to the incoupler based on the field position of the given pixel; and
the controller is further to:
adjust the output light based on the image correction map to reduce at least one of the intensity non-uniformity and the color balance non-uniformity of the image further caused by variations in the incidence position and the incidence angle from one pixel to another.

20. The WHUD of claim 17, wherein the incoupler to receive the output light from the spatial modulator and direct at least a portion of the output light into the light guide, the light guide to internally reflect the portion of the output light to form a reflected light.

* * * * *